United States Patent
Katagiri et al.

(10) Patent No.: US 8,265,409 B2
(45) Date of Patent: Sep. 11, 2012

(54) EDGE PRESERVATION IMAGE PROCESSING DEVICE AND IMAGE PROCESSING METHOD

(75) Inventors: Tetsuya Katagiri, Kyoto (JP); Kazuchika Sato, Kobe (JP)

(73) Assignee: Konica Minolta Holdings, Inc., Tokyo (JP)

( * ) Notice: Subject to any disclaimer, the term of this patent is extended or adjusted under 35 U.S.C. 154(b) by 1272 days.

(21) Appl. No.: 12/004,295

(22) Filed: Dec. 20, 2007

(65) Prior Publication Data

US 2008/0159646 A1 Jul. 3, 2008

(30) Foreign Application Priority Data

Dec. 27, 2006 (JP) .................. 2006-351339

(51) Int. Cl.
G06K 9/40 (2006.01)
G06K 9/48 (2006.01)
H04N 5/00 (2011.01)
H04N 1/60 (2006.01)
H04N 1/40 (2006.01)
H04N 1/38 (2006.01)

(52) U.S. Cl. ........ 382/254; 382/266; 382/199; 382/200; 348/606; 358/1.9; 358/447; 358/461; 358/463

(58) Field of Classification Search .................. None
See application file for complete search history.

(56) References Cited

U.S. PATENT DOCUMENTS

| 7,898,583 | B2* | 3/2011 | Wakahara et al. | 348/252 |
| 2006/0008171 | A1* | 1/2006 | Petschnigg et al. | 382/254 |
| 2007/0071355 | A1* | 3/2007 | Imai | 382/266 |
| 2008/0063296 | A1* | 3/2008 | Von Thal et al. | 382/274 |

FOREIGN PATENT DOCUMENTS

JP 2003-008898 A 1/2003

OTHER PUBLICATIONS

Hiroshi Harashima et al, "e-Separating Nonlinear Digital Filter and its Application", Institute of Electronics, Information and Communication Engineers (IEICE), vol. J65-A, No. 4, Apr. 1982, pp. 297-304; Together with a partial English-translation.

Fredo Durand and Julie Dorsey, "Fast Bilateral Filtering for the Display of High-Dynamic-Range Images", Laboratory for Computer Science, Massachusetts Institute of Technolgy, SIGGRAPH 2002, 10 pp.

Japanese Notification of Reasons for Rejection dated Apr. 12, 2011, for counterpart Japanese Application No. 2006-351339, together with an English translation thereof.

* cited by examiner

*Primary Examiner* — Randolph I Chu

(74) *Attorney, Agent, or Firm* — Cozen O'Connor

(57) ABSTRACT

An image processing device and an image processing method of the invention generate multiple images having different edge preservation performances based on an original image, and synthesize the multiple images based on edge information. In the synthesis, the generated images are synthesized in such a manner that an image of an edge portion in the generated image having a low edge preservation performance is replaced by the generated image having a high edge preservation performance.

9 Claims, 12 Drawing Sheets

EDGE PRESERVATION IMAGE PROCESSING DEVICE AND IMAGE PROCESSING METHOD

Priority is claimed on Japanese Patent Application No. 2006-351339 filed on Dec. 27, 2006, the contents of which are hereby incorporated by reference.

BACKGROUND OF THE INVENTION

1. Field of the Invention

The present invention relates to an image processing device and an image processing method that enable to preserve an edge in a high-quality image.

2. Description of the Background Art

In recent years, in an image sensing apparatus such as a digital camera, as a high-quality image is demanded, a technology of expanding a luminance range i.e. a dynamic range of a subject image to be captured by an image sensor is required. In expanding the dynamic range, there is known an image sensor (hereinafter, called as "linear-logarithmic sensor") having a photoelectric conversion characteristic (hereinafter, also called as "linear/logarithmic characteristic") comprised of a linear characteristic and a logarithmic characteristic. An image which is captured by the linear-logarithmic sensor, and has the linear/logarithmic characteristic is called a "linear-logarithmic image". The linear-logarithmic sensor is capable of generating a natural logarithmically converted output with respect to an incident light amount in the logarithmic characteristic. Therefore, the linear-logarithmic sensor is advantageous in securing a wide dynamic range, as compared with an image sensor merely having a linear characteristic as the photoelectric conversion characteristic.

Observing the linear/logarithmic characteristic of the linear-logarithmic sensor, the linear-logarithmic sensor is capable of generating a high contrast image by photoelectric conversion in the linear characteristic, because the linear characteristic of the linear-logarithmic sensor is the same as that of an ordinary image sensor. If a main subject is clearly identifiable, an image of the main subject can be captured with a high contrast by controlling an exposure in such a manner that the optimal exposure level lies in a linear characteristic region. On the hand, in the logarithmic characteristic, a low contrast image may be outputted by photoelectric conversion in the logarithmic characteristic because an output in the logarithmic characteristic is compressed to one severalth of an output in the linear characteristic, despite that the logarithmic characteristic has an incident light intensity range one hundred times or more as wide as that in the linear characteristic. If the captured image is processed by an ordinary processing method, and the processed image is outputted to an output device such as a monitor or a printer as it is, the outputted image may have a low contrast in a high luminance region i.e. the logarithmic characteristic region, despite that the main subject image has a high contrast and the entirety of the image has a wide dynamic range. The linear-logarithmic sensor has another drawback that an extremely wide output dynamic range is required if the logarithmic characteristic is converted into the linear characteristic. As a result, it is impossible to output an image with such a wide dynamic range to an output device having a narrow dynamic range without processing an image. If the wide dynamic range is compressed in accordance with the narrow dynamic range of the output device without processing an image, the entirety of the output image may have a low contrast. In view of this, an image processing capable of outputting a wide dynamic range image to the output device with a high contrast is required.

The technique of converting a wide dynamic range image into a narrow dynamic range image is called a dynamic range compression. In the dynamic range compression, according to the Retinex theory, light incident onto the retina is defined by the product of an illumination component and a reflectance component with respect to an object. Visual perception has a strong correlation to the reflectance component. In other words, by exclusively narrowing the dynamic range of the illumination component in the wide dynamic range image, a compressed image with a high contrast and a narrow dynamic range can be obtained while preserving the reflectance component having a strong correlation to visual perception.

It is technically difficult to accurately separate an illumination component and a reflectance component in an image. In an ordinary dynamic range compression, frequency separation is often performed to separate the illumination component and the reflectance component. Generally, the illumination component has a spatial frequency that moderately changes, and has a low frequency as compared with the reflectance component. In view of this, the illumination component is extracted by using a low-pass filter (LPF). If the size of the LPF is small, for instance, a two-dimensional digital filter of 3×3 or 5×5 is used, the reflectance component may remain in the extracted illumination component. As a result, the reflectance component in the extracted illumination component may also be compressed in compressing the illumination component, which may lower the contrast in the entire image. In view of this, a relatively large-sized LPF of e.g. 50×50 is required.

If a relatively large-sized LPF i.e. a linear LPF or a Gaussian LPF of performing weighted averaging alone is used, a halo effect may occur at a site where the illumination component in the image sharply changes. The halo effect occurs due to inconsistency between the extracted illumination component and the real illumination component. Particularly, the halo effect is serious in an edge portion of the image. FIG. 12 is a conceptual diagram showing a dynamic range compression using a one-dimensional signal waveform. As shown in the upper part of the illustration E, the real illumination component in an input image I shown in the illustration A has a feature that an edge component is preserved and a component other than the edge component is smoothed. The lower part of the illustration E shows the real reflectance component. If the input image I is filtered through a linear LPF, as shown in the upper part of the illustration B, an illumination component L with a dull edge is extracted. If a reflectance component D is extracted based on the illumination component L and the input image I, the waveform shown in the lower part of the illustration B is obtained as the reflectance component D. The reflectance component D may be fluctuated on or around the edge portion. If the illumination component L is compressed to an illumination component L' as shown in the illustration C, and the product of the compressed illumination component L' and the reflectance component D is calculated, a dynamic range compressed image I' is obtained. As shown in the illustration D, an overshoot region and an undershoot region i.e. halo effects indicated by the encircled portions are generated in the dynamic range compressed image I'. In order to eliminate the halo effect, an LPF capable of preserving edge information i.e. a nonlinear filter called an edge preserving filter is required in extracting an illumination component.

Known examples of the edge preserving filter are an epsilon filter disclosed in a technical document D1, and a bilateral filter disclosed in a technical document D2.

D1: "ε-Separating Nonlinear Digital Filter and its Application" Harashima et al., Institute of Electronics, Information and Communication Engineers (IEICE), Vol. J65-A, No. 4, pp. 297-304, Apr. 1982

D2: "Fast Bilateral Filtering for the Display of High-Dynamic-Range Images" Fredo Durand and Julie Dorsey, SIGGRAPH 2002.

FIG. 13 is a diagram for describing portions where a luminance difference is large in an image G having a dark portion and a bright portion, specifically, edge portions 901 and 902. A signal waveform in the upper part of FIG. 13 represents the edge portion 901 of an object with a slope. The linear filter performs filtering, merely considering a spatial weight. However, the edge preserving filter performs filtering, additionally considering a weight or a threshold value in a luminance direction i.e. vertical directions indicated by the arrows P. In other words, assuming that an LPF having a certain filter size is indicated by a rectangular block 910, although the linear filter merely changes the magnitude of the signal waveform in the spatial direction i.e. horizontal directions indicated by the arrows 911, the edge preserving filter is capable of changing the magnitude of the signal waveform in the luminance direction i.e. vertical directions indicated by arrows 912, as well as in the spatial direction.

Assuming that an epsilon filter is indicated by a rectangular block 920, the epsilon filter enables to smooth all the luminance values within the block 920 into values represented by a straight line 922 passing a targeted luminance value i.e. a targeted pixel value 921. A luminance value outside the block 920 e.g. a luminance value 923 is replaced by a luminance value 924 on the straight line 922. In use of the epsilon filter, the magnitude of the signal waveform in the luminance direction changes depending on the threshold value E. On the other hand, assuming that a bilateral filter is indicated by the same rectangular block 920, the magnitude of the signal waveform in the luminance direction changes by a weight of a Gaussian curve 925 having a characteristic that the weight is approximated to zero, as the luminance value is away from the targeted luminance value 921, in other words, by a weight in the luminance direction corresponding to the threshold value E. As mentioned above, the filter size of the edge preserving filter changes in the luminance direction by changing the threshold value or the weight in the luminance direction.

It is necessary to increase the smoothness of the illumination component in order to secure a high contrast in an output image. Specifically, smoothness is reduced if a reflectance component is left in the illumination component. In view of this, it is required to secure a certain filter size for the edge preserving filter. The edge portion 902 in the image G shows a certain site on a linear object or a rod object 903. In processing the edge portion 902, the following drawback should be considered. The edge portion should be extracted as a reflectance component. An output 931 of the edge preserving filter in the illustration 930 has a configuration that an apex portion of the output 931 is indented or cut away as shown by the solid line 932. The edge component as the reflectance component is left in the illumination component. In other words, part of a detail component is left in the illumination component. This may cause an edge defect such as a pseudo edge in the linear object or the rod object. In view of this, the weight or the threshold value in the luminance direction is increased, i.e. the weight level or the threshold level is increased to extract the edge component as the reflectance component as shown in the illustration 940. This operation, however, may generate a displacement from the actual luminance level as indicated by portions 951 in an edge portion other than the edge portion 902 e.g. the edge portion 901. In other words, since the entirety of the waveform is smoothed in the similar manner as in the case of using the linear LPF, a halo effect may occur in the edge portion 901 by dynamic range compression in the similar manner as described above.

SUMMARY OF THE INVENTION

In view of the above problems residing in the prior art, it is an object of the invention to provide an image processing device and an image processing method that enable to properly preserve an edge portion with no or less halo effect or the like in the edge portion in performing dynamic range compression to obtain a high contrast image in a low luminance region and a high luminance region.

An image processing device and an image processing method according to an aspect of the invention generate multiple images having different edge preservation performances based on an original image, and synthesize the multiple images based on edge information. In the synthesis, the generated images are synthesized in such a manner that an image of an edge portion in the generated image having a low edge preservation performance is replaced by the generated image having a high edge preservation performance. The inventive image processing device and image processing method are advantageous in properly preserving the edge portion while suppressing occurrence of a halo effect or the like in the edge portion.

These and other objects, features and advantages of the present invention will become more apparent upon reading the following detailed description along with the accompanying drawings.

DETAILED DESCRIPTION OF THE PREFERRED EMBODIMENTS (First Embodiment)

Figure 1:
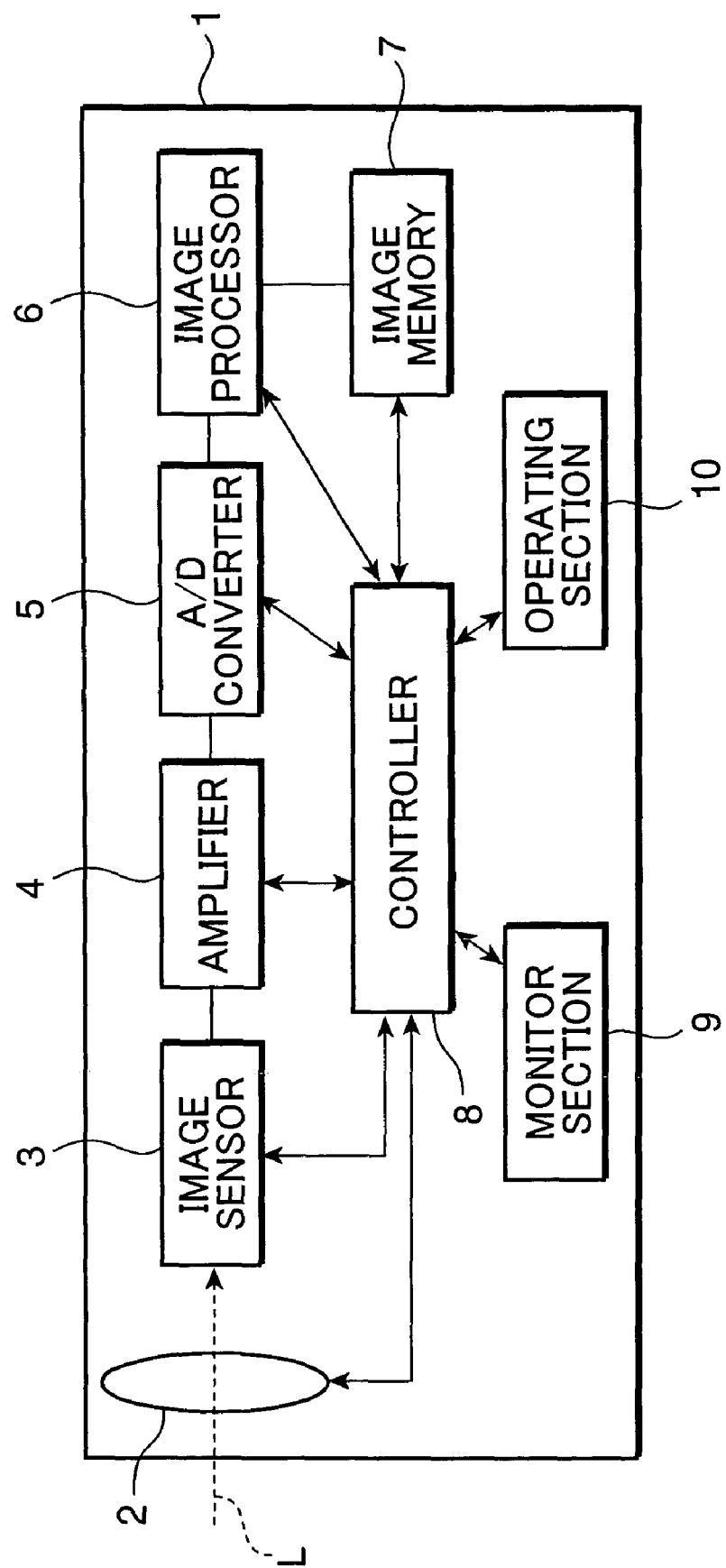
FIG. 1 is a block diagram showing elements primarily relating to an imaging processing of a digital camera, as an example of an image sensing apparatus to which an image processing device in accordance with a first embodiment of the invention is applied.

FIG. 1 is a block diagram showing elements primarily relating to an imaging processing of a digital camera, as an example of an image sensing apparatus to which an image processing device in accordance with a first embodiment of the invention is applied. Referring to FIG. 1, a digital camera 1 includes a lens section 2, an image sensor 3, an amplifier 4, an analog-to-digital (A/D) converter 5, an image processor 6, an image memory 7, a controller 8, a monitor section 9, and an operating section 10.

The lens section 2 functions as a lens aperture for allowing light from a subject i.e. an optical image to pass. The lens section 2 constitutes an optical lens system for guiding the subject light toward the image sensor 3 disposed in the camera body. The lens section 2 has a diaphragm (not shown) and a shutter (not shown) for regulating the amount of light transmitted through the lens aperture. The controller 8 controls driving of the diaphragm or the shutter.

Figure 2:
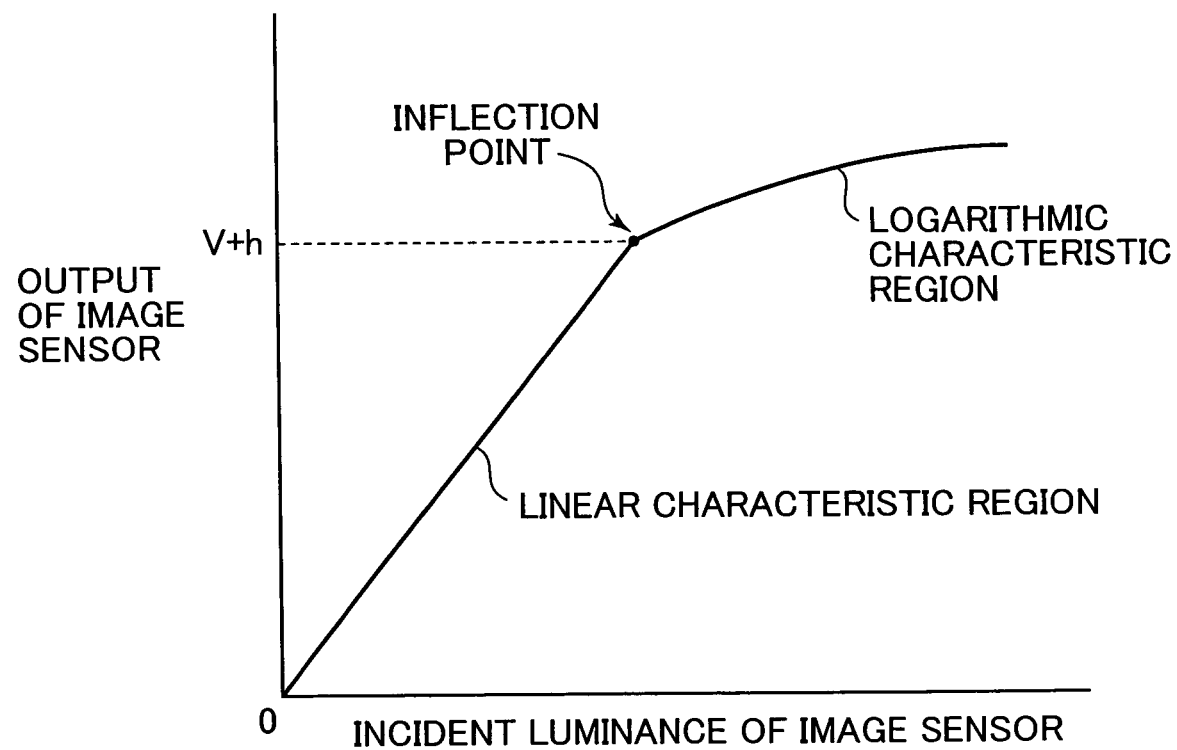
FIG. 2 is a graph showing a photoelectric conversion characteristic of an image sensor shown in FIG. 1.

The image sensor 3 photoelectrically converts the subject light into image signals of respective components of R, G, and B in accordance with the amount of subject light captured by the lens section 2, and outputs the conversion result to the amplifier 4. In this embodiment, a solid-state image sensor having different photoelectric conversion characteristics is used as the image sensor 3. Specifically, as shown in FIG. 2, the image sensor 3 is a solid-state image sensor having photoelectric conversion characteristics comprised of a linear characteristic region where an output pixel signal as an output electric signal generated by photoelectric conversion is linearly converted for output, when an incident luminance of the image sensor is low i.e. a dark image is captured, and a logarithmic characteristic region where the output pixel signal is logarithmically converted for output, when the incident luminance of the image sensor is high i.e. a bright image is captured. In other words, the image sensor 3 has a linear photoelectric conversion characteristic in a low luminance region, and a logarithmic photoelectric conversion characteristic in a high luminance region. The image sensor 3 is for instance a two-dimensional MOS solid-state image sensor (CMOS image sensor) provided with a N-channel or P-channel MOSFET or FD (floating diffusion). Alternatively, the image sensor 3 may be a VMIS image sensor, a CCD image sensor, or a like sensing device, in place of the CMOS image sensor. The image sensor 3 is capable of flexibly switching over between a photoelectric conversion characteristic merely comprised of a linear characteristic, and a photoelectric conversion characteristic merely comprised of a logarithmic characteristic, as well as the photoelectric conversion characteristic comprised of the linear/logarithmic characteristic. A switching point (hereinafter, called as "inflection point") between the linear characteristic region and the logarithmic characteristic region is flexibly controlled based on a predetermined control signal to be outputted to the respective pixel circuits of the image sensor 3.

The amplifier 4 amplifies the image signal outputted from the image sensor 3. The amplifier 4 includes an AGC (auto gain control) circuit, and adjusts a gain of the outputted image signal. The amplifier 4 may include a CDS (correlation double sampling) circuit for reducing a sampling noise in the image signal as an analog value, in addition to the AGC circuit. The gain to be applied to the AGC circuit is set by the controller 8. The A/D converter 5 performs analog-to-digital conversion of converting the analog image signal amplified by the amplifier 4 into a digital image signal. The A/D converter 5 converts a pixel signal outputted from the image sensor 3 into pixel data of e.g. 12 bits.

The image processor 6 performs various image processing with respect to the image signal after the A/D conversion. The image processing includes color processing such as color interpolation, color correction, and color spatial conversion; and white balance (WB) correction; and dynamic range compression. A primary feature of the first embodiment is that high contrast processing is performed to obtain a high contrast image while preserving an edge component, and suppressing occurrence of a halo effect or the like in the dynamic range compression. The high contrast processing will be described later.

The image memory 7 includes a memory device such as an ROM (Read Only Memory) or an RAM (Random Access Memory). The image memory 7 stores data including raw image data before being processed by the image processor 6, and image data during processing or after processing by the image processor 6 or the controller 8. The controller 8 includes an ROM for storing various control programs, an RAM for temporarily storing various data, and a central processing unit (CPU) for reading the control program or the like from the ROM for execution. The controller 8 controls overall operations of the digital camera 1. Particularly, the controller 8 controls the image processor 6 to perform image processing concerning high contrast processing to be described later.

The monitor section 9 includes a liquid crystal display (LCD) e.g. a color liquid crystal display device provided on a rear surface of the digital camera 1. The monitor section 9 displays an image captured by the image sensor 3, in other words, an image processed by the image processor 6, an image stored in the image memory 7, and the like. The operating section 10 is adapted to allow a user to designate an input command to the digital camera 1. The operating section 10 is provided with various operation switches or operation buttons e.g. a power source switch, a release switch, a mode setting switch for setting various photographing modes, and a menu selection switch. For instance, when the release switch is turned on, a series of photographing operations comprising: sensing subject light by the image sensor 3; applying a predetermined image processing to image data acquired by the capturing operation; and recording the processed image data into the image memory 7 or a like device are executed.

Figure 3:
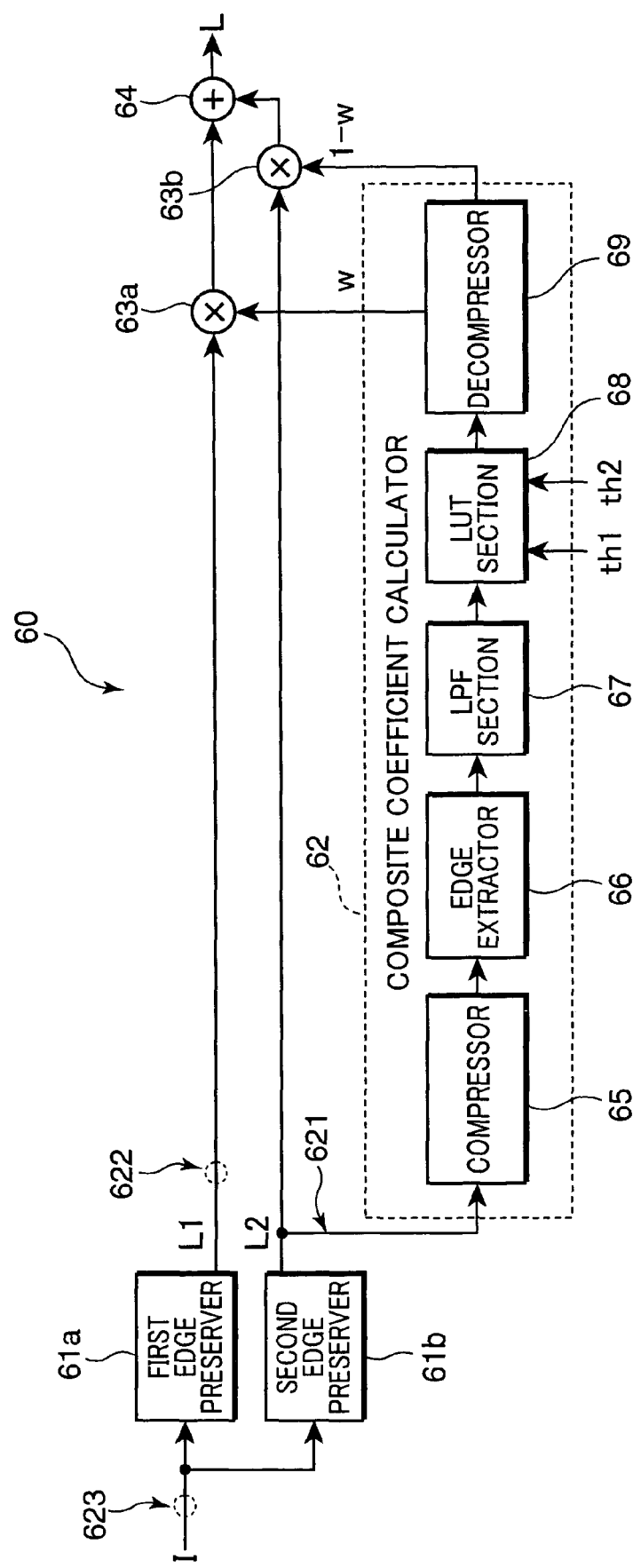
FIG. 3 is a block diagram showing a configuration of a high contrast processor in an image processor shown in FIG. 1.

A wide dynamic range image captured by the image sensor 3 is inputted to the image processor 6. In the following, the high contrast processing with respect to the wide dynamic range image is described. Hereinafter, the wide dynamic range image to be inputted to the image processor 6 is sometimes called as an input image or an original image according to needs. FIG. 3 is a block diagram showing a function (hereinafter, called as a high contrast processor 60) relating to the high contrast processing in the image processor 6. Referring to FIG. 3, the high contrast processor 60 for executing the high contrast processing includes a first edge preserver 61a, a second edge preserver 61b, a composite coefficient calculator 62, a first multiplier 63a, a second multiplier 63b, and an adder 64.

The first edge preserver 61a performs edge preservation filter processing with respect to an input image I by a first edge preserving filter having a first edge preservation performance. The second edge preserver 61b performs edge preservation filter processing with respect to the input image I by a second edge preserving filter having a second edge preservation performance different from the first edge preservation performance. By the edge preservation filter processing of the first edge preserver 61a and the second edge preserver 61b, illumination components L1 and L2 whose edge portion is preserved are extracted from the input image I, respectively.

The term "edge preservation performance" indicates a degree of preserving an edge or an edge component in the original image. The edge preservation performance may be a coefficient or a parameter, and corresponds to the aforementioned threshold value or weight in the luminance direction. In the case where an epsilon filter is used as the edge preserving filter, the edge preservation performance is defined by the threshold value E. In the case where a bilateral filter is used as the edge preserving filter, the edge preservation performance is defined by a standard deviation σg, which corresponds to the weight of the bilateral filter, of a Gaussian function "g" as an influence function. Alternatively, an edge reproduction performance may be used in place of the edge preservation performance.

Figure 13:
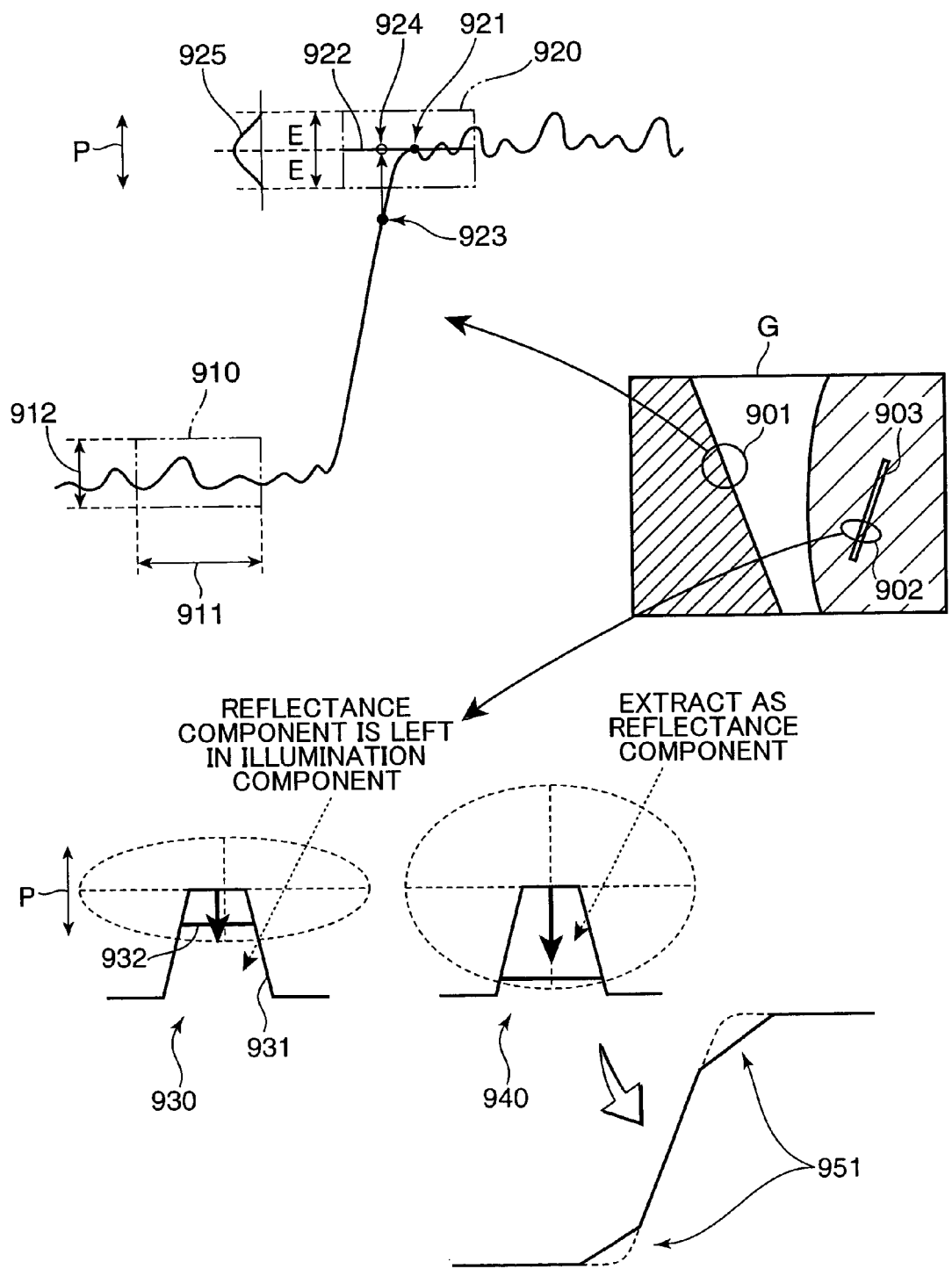
FIG. 13 is a schematic diagram for describing an edge portion in an image with a dark portion and a bright portion, where a luminance difference is large.

In this embodiment, the first edge preserving filter in the first edge preserver 61a has an edge preservation performance higher than that of the second edge preserving filter in the second edge preserver 61b. Specifically, the threshold value E or the standard deviation σg of the first edge preserving filter is set smaller than the threshold value E or the standard deviation σg of the second edge preserving filter. As shown by the illustration 930 in FIG. 13, the smaller the threshold value E or the standard deviation σg is, the more the edge component or the edge is preserved. Thus, the first edge preserver 61a and the second edge preserver 61b in the high contrast processor 60 perform edge preservation filter processing by changing the edge preservation performance. In other words, the high contrast processor 60 generates multiple images having different edge preservation performances i.e. illumination component images or illumination components L1 and L2, based on the input image I. The illumination component L1 corresponds to an image obtained by the edge preservation filter processing at the high edge preservation performance, in other words, a high-frequency image. Since the edge component is a reflectance component i.e. a high-frequency component, the illumination component L2 corresponds to an image obtained by the edge preservation filter processing at the low edge preservation performance, in other words, a low-frequency image.

The composite coefficient calculator 62 calculates a composite coefficient to be used in synthesizing the illumination components L1 and L2 having different edge preservation performances, which have been extracted by the first edge preserver 61a and the second edge preserver 61b. The composite coefficient is coefficients "w" and "1-w" obtained from a weighting coefficient "w", which will be described later.

The first multiplier 63a multiplies the illumination component L1 outputted from the first edge preserver 61a, and the illumination component L2 outputted from the composite coefficient calculator 62 i.e. the illumination component L2 which has undergone the processing by functional parts 65 through 69, with the composite coefficient "w". The second multiplier 63b multiplies the illumination component L2 outputted from the second edge preserver 61b, and the illumination component L2 outputted from the composite coefficient calculator 62, with the composite coefficient "1-w". The adder 64 sums up i.e. synthesizes the illumination components outputted from the first multiplier 63a and the second multiplier 63b. The adder 64 outputs the summation result as an illumination component L.

In this embodiment, the composite coefficient calculator 62 includes a compressor 65, an edge extractor 66, an LPF (low-pass filter) section 67, an LUT (lookup table) section 68, and a decompressor 69. The compressor 65 compresses the illumination component image i.e. the illumination component L2 outputted from the second edge preserver 61b. The compression is realized by low-pass filter processing using an ordinary linear low-pass filter of performing weighted averaging, and pixel interpolation. The compression is performed to remove a high-frequency component, in other words, to preserve a low-frequency component as much as possible. By the compression, the illumination component L2 is compressed to an image size one-twentieth as large as the original size, for instance. By compressing the image as mentioned above, in the case where an area corresponding to the sky shown in FIG. 5 includes a linear object such as a power line or a rod object such as a guard rail, a picture of the linear object or the rod object is erased. In this embodiment, since image compression is performed, in other words, a compressed image is processed, the processing load is reduced. As a result, a processing time required in the functional parts to be described later, or a processing time required in the entirety of the high contrast processor 60 can be reduced.

The edge extractor 66 extracts, calculates, or detects an edge intensity in the illumination component image. The edge extractor 66 performs a filter processing i.e. an edge intensity extraction, using a filter for extracting an edge intensity such as a Sobel filter to calculate an edge intensity based on the compressed image. The Sobel filter is a filter for detecting a gradient between pixel values in an image based on differentiation to detect an edge intensity in the image. Information on the edge intensity extracted by the edge extractor 66 is outputted to the LUT section 68 to be described later. The edge intensity extracting filter may be a Prewitt filter, in place of the Sobel filter.

The LPF section 67 performs a low-pass filter processing with respect to the illumination component image i.e. the illumination component L2 outputted from the edge extractor 66, using the linear LPF, a median filter, or a like filter. It is desirable to provide the LPF section 67 to remove a noise component in the illumination component image after the edge intensity extraction. Alternatively, the LPF section 67 may be omitted.

The LUT section 68 receives edge information relating to the edge intensity from the edge extractor 66, normalizes the edge intensity, and converts the normalized edge intensity into a predetermined weighting coefficient, using predetermined threshold values th1 and th2. The conversion is performed by using e.g. a lookup table. The weighting coefficient represented by the symbol "w" is a weight to be applied to the illumination components L1 and L2 in synthesizing the illumination components L1 and L2. The weight represents a composite ratio of the illumination component L1 to the illumination component L2, or the illumination component L2 to the illumination component L1 in synthesizing the illumination components L1 and L2. The weighting coefficient "w" is used as the composite coefficient "w" to be applied to the illumination component L1 in multiplication by the first multiplier 63a, and is used as the composite coefficient "1-w" to be applied to the illumination component L2 in multiplication by the second multiplier 63b, as well as the illumination component image i.e. the illumination component L2 which has undergone decompression by the decompressor 69 to be described later.

Figure 4:
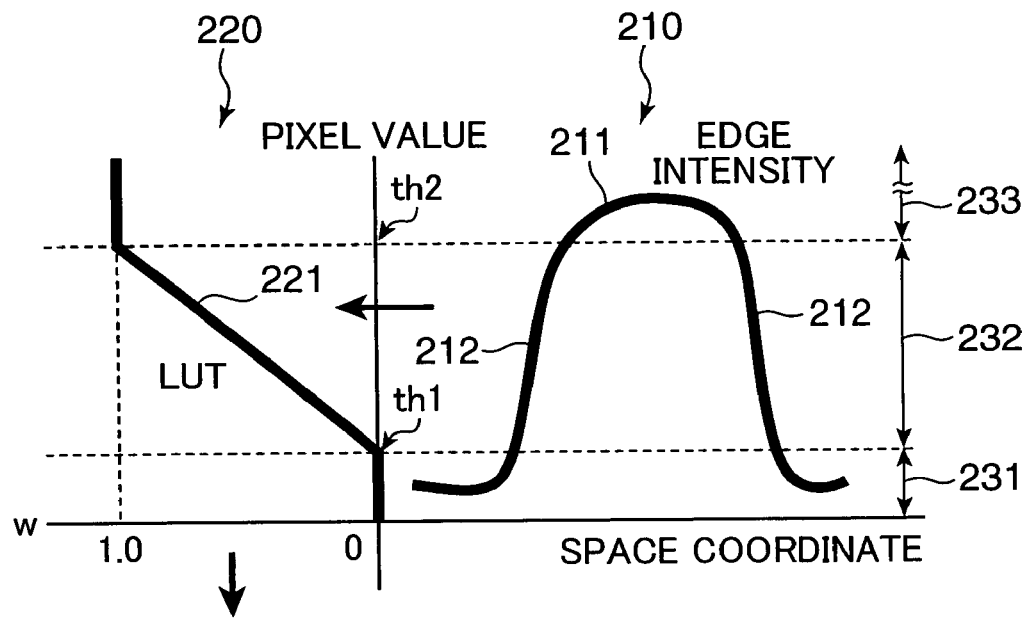
FIG. 4 is a graph for describing a lookup table conversion using threshold values in an LUT section shown in FIG. 3.

FIG. 4 is a diagram for describing a lookup table conversion, using the threshold values th1 and th2. The illustration 210 on the right side of FIG. 4 shows a graph of an edge intensity extracted by the edge extractor 66, wherein the axis of ordinate represents pixel values, and the axis of abscissas represents coordinate values in the spatial direction The illustration 220 on the left side of FIG. 4 shows a graph of a conversion characteristic 221 using the lookup table, wherein the axis of ordinate represents pixel values, and the axis of abscissas represents weighting coefficient values. As shown in FIG. 4, the threshold value th1 is a predetermined value in a low edge intensity region, and the threshold value th2 is a predetermined value in a high edge intensity region.

The conversion characteristic 221 has a feature that in a pixel value range from 0 to the threshold value th1, the value of the weighting coefficient "w" is 0; in a pixel value range over the threshold value th2, the weighting coefficient "w" is 1.0; and in a pixel value range from the threshold value th1 to the threshold value th2, the value of the weighting coefficient "w" is linearly increased from 0 to 1.0. The value of the threshold may be included in any pixel value range. In other words, the conversion characteristic 221 is a characteristic that the value of the weighting coefficient "w" is 0, or 1.0, or any value (hereinafter, called as an "intermediate value") between 0 and 1.0, depending on the threshold values th1 and th2. A gradient of the conversion characteristic 221 in the pixel value range from the threshold value th1 to the threshold value th2 changes depending on the threshold values th1 and th2.

The LUT section 68 calculates a weighting coefficient "w" corresponding to the edge intensity, based on the conversion characteristic 221 as a lookup table. Specifically, the value of the weighting coefficient "w" is calculated in such a manner that the value of the weighting coefficient "w" corresponding to the edge intensity in the pixel value range 231 is 0; the value of the weighting coefficient "w" corresponding to the edge intensity in the pixel value range 232 is the intermediate value from 0 to 1.0; the value of the weighting coefficient "w" corresponding to the edge intensity in the pixel value range 233 is 1.0. In the case where the value of the weighting coefficient "w" is zero as a result of calculation by the LUT section 68, the values of the composite coefficients "w" and "1-w" to be outputted from the decompressor 69 to the first multiplier 63a and the second multiplier 63b are respectively "0" and "1". In the case where the value of the weighting coefficient "w" is 1.0, the values of the composite coefficients "w" and "1-w" are respectively "1" and "0". In the case where the value of the weighting coefficient "w" is the intermediate value "α", the values of the composite coefficients "w" and "1-w" are respectively "α" and "1-α". The threshold values th1 and th2 are pre-stored in the controller 8 as fixed values. The controller 8 supplies the threshold values th1 and th2 in performing the conversion.

The decompressor 69 decompresses the illumination component image i.e. the illumination component L2 outputted from the LUT section 68 to restore the size of the illumination component L2 which has undergone the compression by the compressor 65. The decompression is a general linear interpolation with respect to the illumination component L2. Alternatively, the order of conversion by the LUT section 68 and decompression by the decompressor 69 may be interchanged.

Figure 5:
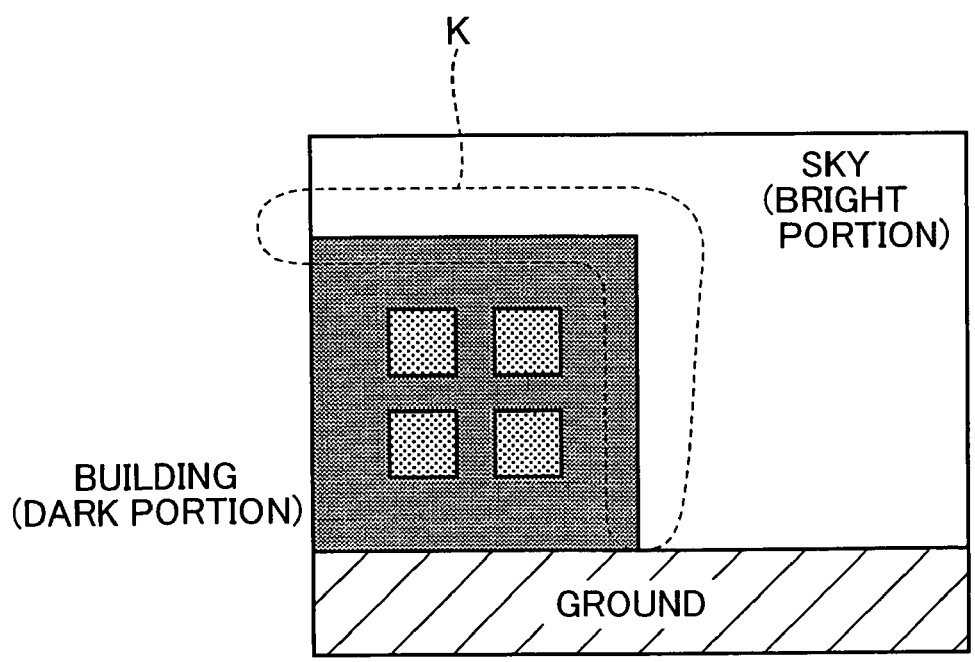
FIG. 5 is a diagram showing a landscape image for describing an influence of a halo effect to an edge portion.

An edge defect such as a halo effect is serious in a boundary where a luminance difference in the image is large and the image size i.e. the image width is large, for instance, in an area K between a building as a dark portion and the sky as a bright portion as shown in FIG. 5. As described above, the compressor 65 compresses the illumination image L2, and the edge extractor 66 detects an edge intensity based on the compressed image. The weighting coefficient "w" that enables to form the area e.g. the area K where the edge intensity is large of the illumination component L1 having a high edge preservation performance, and to form an area other than the large edge intensity area of the illumination component L2. In FIG. 4, a portion 211 of the edge intensity curve corresponding to the pixel value range 233 serves as the illumination component L1, and portions 212 of the edge intensity curve other than the portion 211, corresponding to the pixel value ranges 232 and 231, serve as the illumination component L2.

Figure 6:
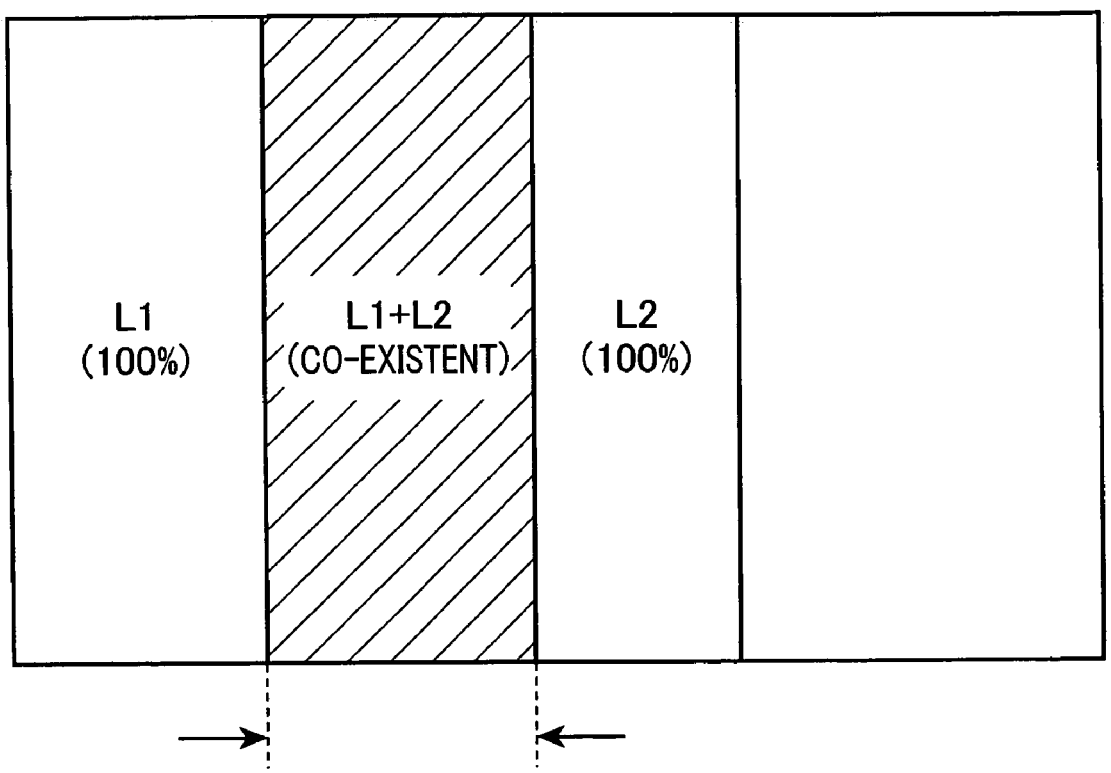
FIG. 6 is a conceptual diagram for describing relations between the threshold values, and co-existent regions of different illumination components.

To summarize the above, in the range where the weighting coefficient "w" is 1.0 i.e. the range where the edge intensity is larger than the threshold value th2, the illumination component L1 is used at 100% in synthesizing the illumination components L1 and L2. In the range where the weighting coefficient "w" is 0 i.e. the range where the edge intensity is smaller than the threshold value th1, the illumination component L2 is used at 100% in synthesizing the illumination components L1 and L2. In the range where the weighting coefficient "w" is the intermediate value from 0 to 1.0 i.e. the range where the edge intensity is from the threshold value th1 to the threshold value th2, the illumination components L1 and L2 are used at a predetermined ratio, in other words, at 100% in total in synthesizing the illumination components L1 and L2. In this approach, by changing the threshold values th1 and th2 i.e. selecting a large fixed value or a small fixed value as the threshold value, as shown in the conceptual diagram of FIG. 6, an area where the illumination components L1 and L2 coexist can be increased or decreased. In this approach, by lowering the threshold value th1, in other words, by using a small threshold value as the threshold value th1, and by raising the threshold value th2, in other words, by using a large threshold value as the threshold value th2, synthesis can be performed up to a position near the edge portion i.e. to the vicinity of the edge portion. In other words, the limit of the area where the illumination component L2 is replaceable by the illumination component L1 can be extended to a site near the boundary between the edge portion and a peripheral image of the edge portion.

Alternatively, a gamma (γ) function may be used in place of the conversion characteristic 221. In the modification, gamma coefficients serve as the threshold values th1 and th2. In the embodiment, the composite coefficient derived from the edge intensity is calculated by using the conversion lookup table. Alternatively, the calculation may be performed by using a predetermined conversion formula i.e. an arithmetic expression.

As described above, multiplication and summation i.e. inner product computation is performed by the first multiplier 63a, the second multiplier 63b, and the adder 64 by using the weighting coefficient "w" calculated by the composite coefficient calculator 62. A final image i.e. the illumination component L is generated by synthesis, in which the illumination component L1 having a high edge preservation performance is selected as the edge portion within the illumination component L2. In other words, the high contrast processor 60 extracts an edge portion i.e. an edge area from the illumination component L2 having a low edge preservation performance, and the extracted edge portion is replaced by the illumination component L1 having a high edge preservation performance. The replacement represents a ratio of the illumination component L1 relative to the illumination component L2 in synthesizing the illumination components L1 and L2. The coexistent ratio of the illumination components L1 and L2 is determined by the weighting coefficient "w".

The illumination component L outputted from the high contrast processor 60 in the image processor 6 undergoes dynamic range compression by a dynamic range compressor (not shown) into an illumination component L'. The dynamic range compressor is provided after the high contrast processor 60. A final output image O (=L/L'*I) is generated based on the illumination component L, the illumination component L', and the original image I, where the symbol "/" indicates division, and the symbol "*" indicates multiplication.

Figure 7:
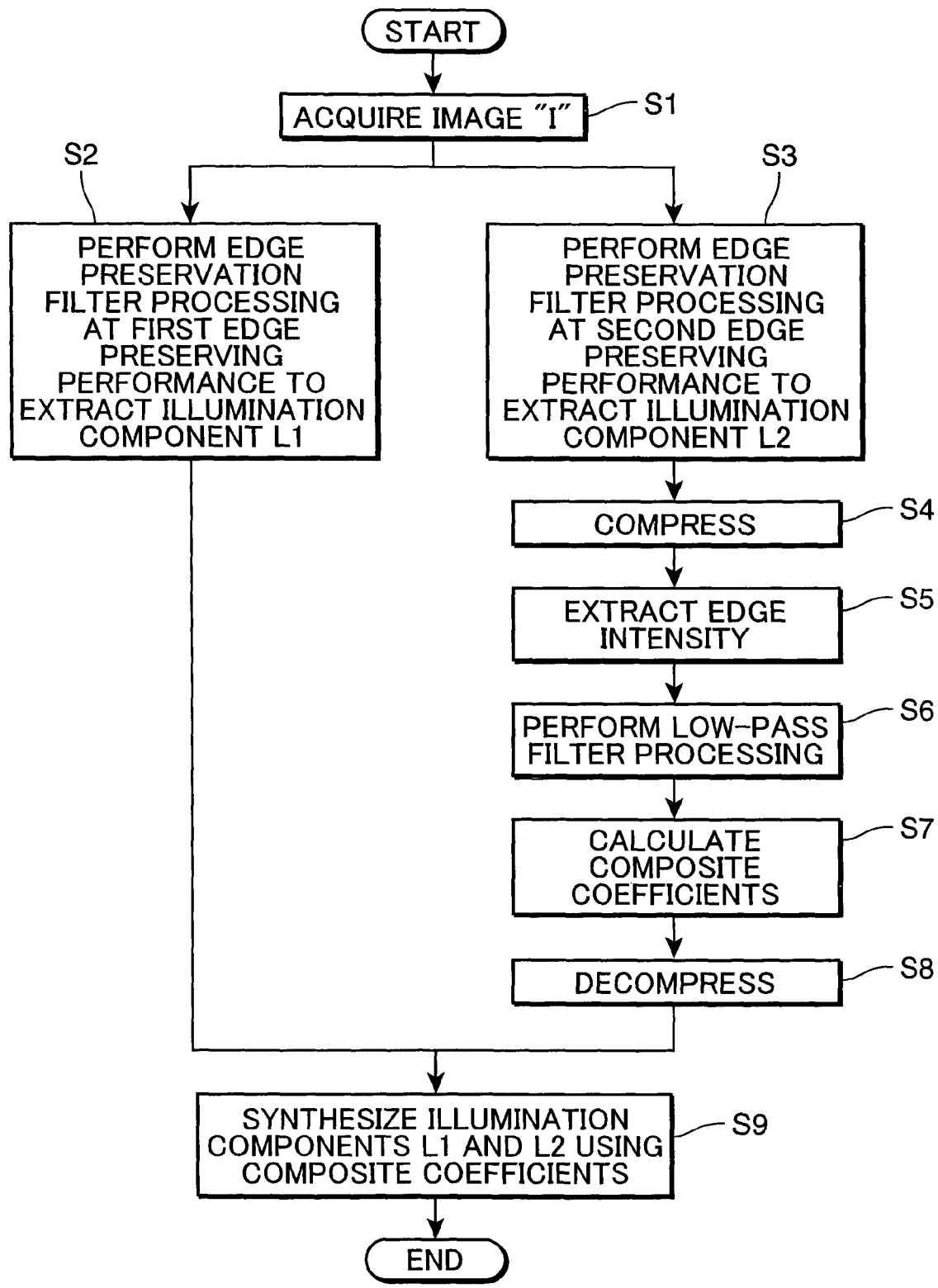
FIG. 7 is a flowchart showing an operation to be executed by the high contrast processor in the first embodiment.

FIG. 7 is a flowchart showing an operation of the high contrast processing to be executed by the high contrast processor 60 in the first embodiment. Referring to FIG. 7, first, an image I is captured by a sensing operation of the image sensor 3, and the captured image I is inputted to the high contrast processor 60 (Step S1). Then, the input image I undergoes an edge preservation filter processing by the first edge preserver 61a having the first edge preservation performance to extract the illumination component L (Step S2). On the other hand, the input image I undergoes an edge preservation filter processing by the second edge preserver 61b having the second edge preservation performance to extract the illumination component L2 (Step S3). The illumination component L2 is inputted to the composite coefficient calculator 62 where the illumination component L2 is compressed into a compressed image by the compressor 65 (Step S4). Then, an edge intensity is extracted from the compressed image i.e. the compressed illumination component L2 by the edge extractor 66 (Step S5).

Then, the illumination component image outputted from the edge extractor 66 undergoes a low-pass filter processing by the LPF section 67 (Step S6). Thereafter, conversion with use of a lookup table is performed by the LUT section 68 with respect to the illumination component image after the low-pass filter processing to calculate a weighting coefficient "w" corresponding to the extracted edge intensity (Step S7). Then, the decompressor 69 decompresses the illumination component image after the lookup table conversion to obtain an illumination component L2 whose size is restored to the size of the illumination component L2 inputted to the composite coefficient calculator 62 (Step S8). Then, the first multiplier 63a multiplies the restored illumination component L2 and the illumination component L1 outputted from the first edge preserver 61a with the composite coefficient "w" for synthesis, and the second multiplier 63b multiplies the restored illumination component L2 and the illumination component L2 outputted from the second edge preserver 61b with the composite coefficient "1-w" for synthesis. Then, the adder 64 sums up the illumination components L1 and L2 outputted from the first multiplier 63a and the second multiplier 63b to output an illumination component L (Step S9).

(Second Embodiment)

Figure 8:
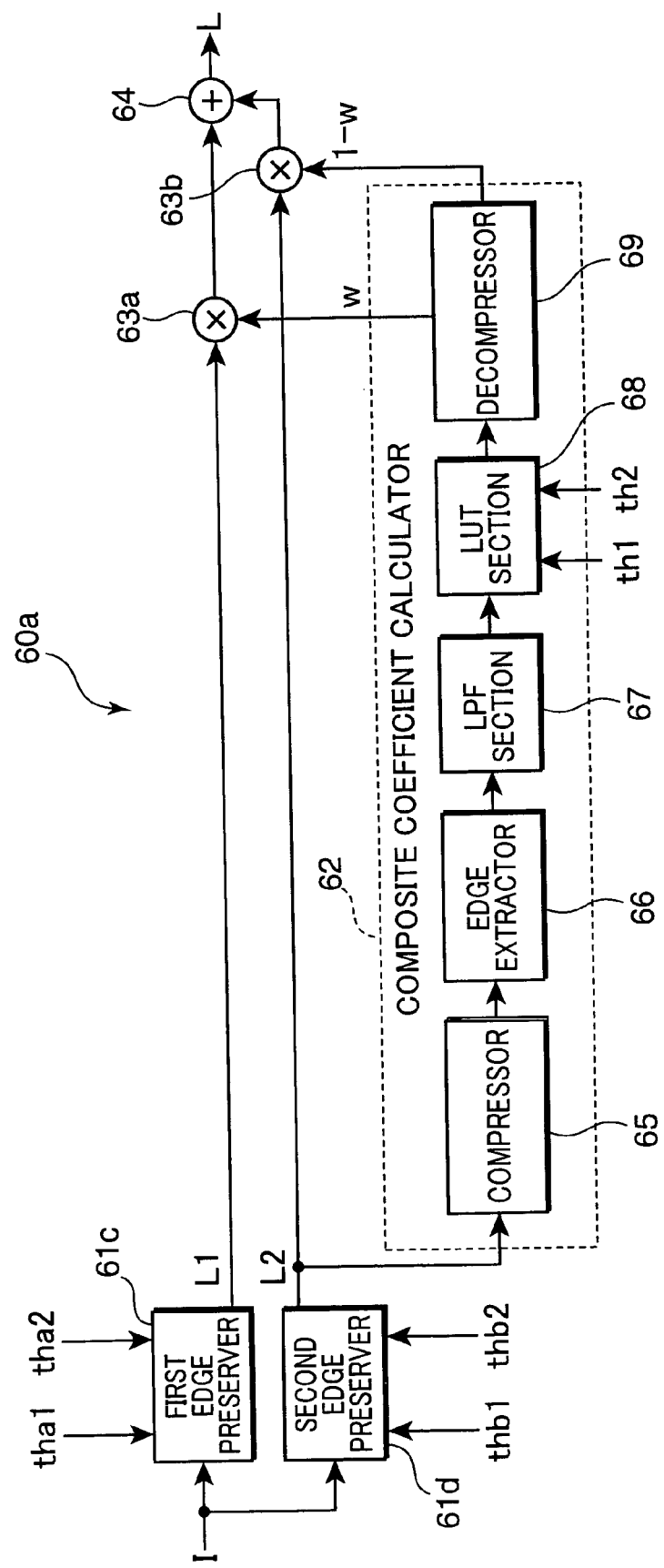
FIG. 8 is a block diagram showing a configuration of a high contrast processor in a second embodiment of the invention.

FIG. 8 is a block diagram showing a configuration of a high contrast processor 60a in a second embodiment of the invention. The high contrast processor 60a is primarily different from the high contrast processor 60 shown in FIG. 3 in that a first edge preserver 61c and a second edge preserver 61d are provided in place of the first edge preserver 61a and the second edge preserver 61b. The first edge preserver 61a and the second edge preserver 61b are operative to obtain an illumination component whose edge component is preserved by using an edge preserving filter such as an epsilon filter or a bilateral filter. The first edge preserver 61c and the second edge preserver 61d are operative to obtain an illumination component whose edge component is preserved by performing hierarchical low-pass filter processing. In the following, an arrangement of the first edge preserver 61c and the second edge preserver 61d, and the hierarchical low-pass filter processing are described.

Figure 9:
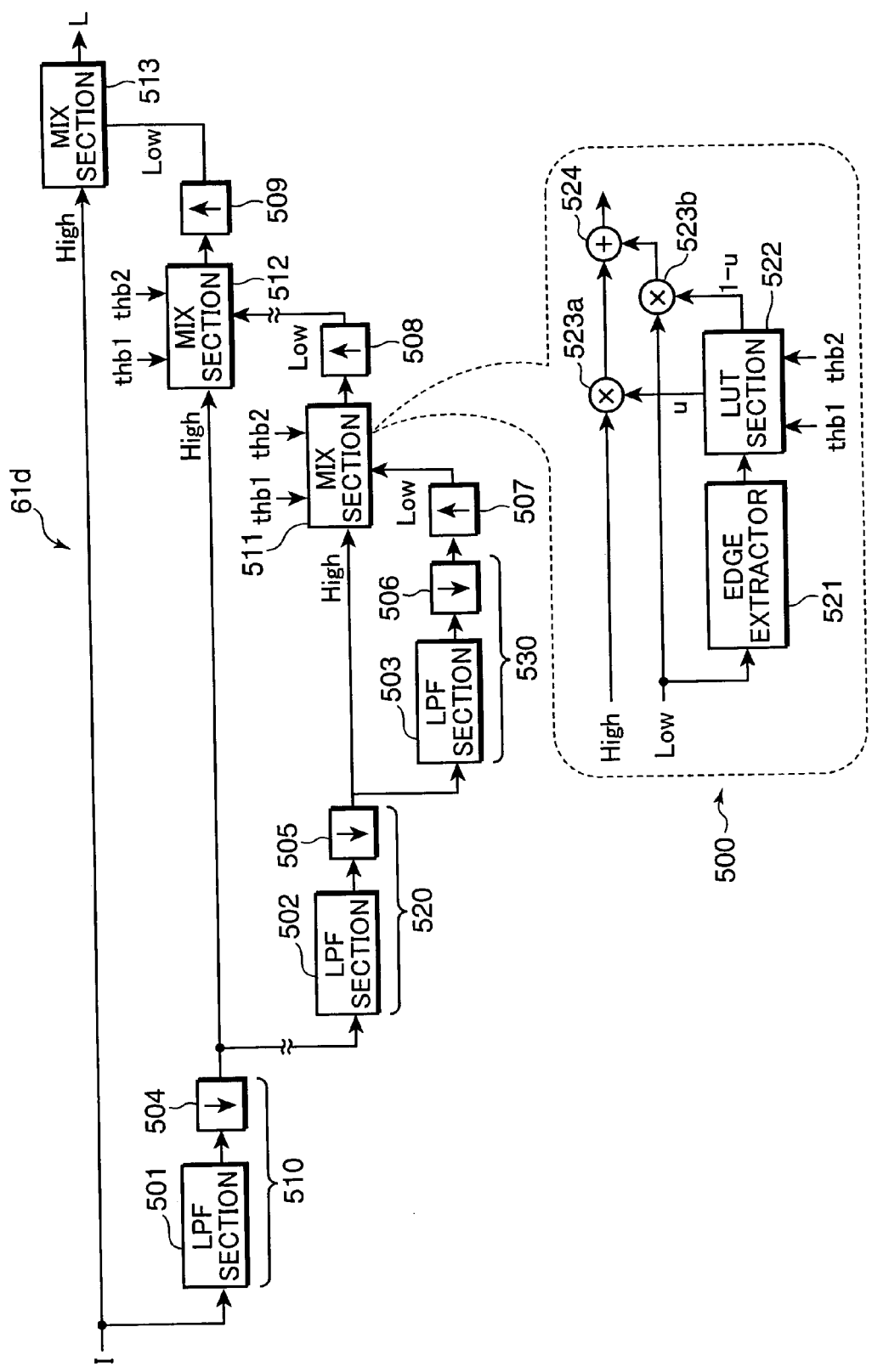
FIG. 9 is a block diagram showing a configuration of a second edge preserver shown in FIG. 8.

FIG. 9 is a block diagram showing a configuration of the second edge preserver 61d. Since the first edge preserver 61c and the second edge preserver 61d have the same configuration, the second edge preserver 61d is described as a representative. The second edge preserver 61d includes LPF sections 501, 502, 503 and DS (downsampling) sections 504, 505, 506; US (upsampling) sections 507, 508, 509; and MIX sections 511, 512, 513, which correspond to operations in multiple hierarchical processing stages. In this embodiment, the hierarchical processing is divided into three stages. Alternatively, the hierarchical processing may be divided into two stages or more than three stages. In the case where the hierarchical processing is divided into n-stages (n≧4), the processing stage where the LPF section 501 and the DS section 504 are provided corresponds to the first stage; and the processing stage where the LPF section 503, the DS section 506, and the US section 507 are provided corresponds to the lowermost stage i.e. the n-th stage.

The LPF sections 501, 502, 503 perform an ordinary low-pass filter processing of performing a weighted averaging. The DS sections 504, 505, 506 perform downsampling with respect to an image which has undergone the low-pass filter processing by the LPF sections 501, 502, 503, respectively. The LPF section 501 and the DS section 504 in pair constitute a compressor 510 for compressing an image. The compressor 510 corresponds to the compressor 65 (see FIG. 3). Specifically, a compressed image at the first stage is generated based on an input image I by performing low-pass filter processing by the LPF section 501 and pixel interpolation by the DS section 504 i.e. by performing low-pass filter processing and interpolation. In this way, an image is smoothed by low-pass filter processing, followed by pixel interpolation. This is advantageous in preventing generation of moire or a like phenomenon.

Similarly to the first processing stage, in the second processing stage, a compressor 520 performs low-pass filter processing and interpolation with respect to the compressed image outputted from the compressor 510. Then, in the third processing stage, a compressor 530 performs low-pass filter processing and interpolation with respect to the compressed image outputted from the compressor 520. Thus, by performing a series of low-pass filter processing and interpolation by the compressors 510, 520, 530 interconnected with each other, the original image I is stepwise compressed. The approach of hierarchically compressing an image i.e. reducing the image size by interconnecting the multiple compressors is, in other words, an approach of generating an image while stepwise expanding the width of the filter window without changing the height of the filter window, as the processing proceeds to a lower stage.

The US sections 507, 508, 509 perform upsampling with respect to an image, in other words, decompresses an image. The MIX sections 511, 512, 513 each synthesizes an image outputted from the US section at a certain stage, and an image outputted from the DS section at the stage higher than the certain stage by one. The image to be synthesized by the MIX section 513 at the uppermost stage is the input image I. The MIX sections 511, 512, 513 each calculates a composite coefficient corresponding to the edge intensity, and synthesizes the images based on the composite coefficient.

The illustration 500 in the lower part of FIG. 9 shows a configuration of the MIX section 511. Since the configurations of the MIX sections 512 and 513 are the same as that of the MIX section 511, the configuration of the MIX section 511 is described as a representative. The MIX section 511 includes an edge extractor 521, an LUT section 522, a first multiplier 523a, a second multiplier 523b, and an adder 524. As shown in FIG. 9, inputted to the MIX section 511 are a low-frequency image "low" as a processing result at the lowermost stage in this embodiment, and a compressed image i.e. a high-frequency image "High" outputted from the compressor 520 at the stage higher than the lowermost; stage by one. The image to be outputted from the individual stages is called a low-frequency image or a high-frequency image based on the hierarchical relations between the stages. The more the low-pass filter processing and interpolation is repeated, a frequency component or a frequency band or a band component of a lower frequency is separated and extracted from the input image I, with the result that an image with large blur i.e. large smoothness is generated. In this sense, the MIX sections 511, 512, 513 are each a synthesizer for synthesizing two images of different blurs.

The edge extractor 521 and the LUT section 522 correspond to the edge extractor 66 and the LUT section 68 in the first embodiment. The edge extractor 521 extracts an edge intensity from the inputted low-frequency image, and outputs the edge information to the LUT section 522. Similarly to the LUT section 68, the LUT section 522 receives the edge information, normalizes the edge intensity, and converts the normalized edge intensity into a weighting coefficient "u" by using threshold values thb1 and thb2 corresponding to the normalized edge intensity. Composite coefficients "u" and "1-u" are derived from the weighting coefficient "u". Similarly to the processing by the first multiplier 63a, the second multiplier 63b, and the adder 64 in the first embodiment, the first multiplier 523a, the second multiplier 523b, and the adder 524 are operative to synthesize the high-frequency image and the low-frequency image by inner product computation, using the composite coefficients "u" and "1-u"; and output a synthesized image to the US section 508. The MIX sections 512 and 513 perform a similar processing as the MIX section 511. Finally, an illumination component L is outputted by synthesizing the low-frequency image "Low" inputted to the MIX section 513, and the input image I i.e. a high-frequency image "High". FIG. 9 illustrates the processing to be executed by the second edge preserver 61d. Accordingly, the illumination component L to be outputted from the MIX section 513 is the illumination component L2 in FIG. 8. The threshold values thb1 and thb2 are pre-stored in a controller 8 as fixed values. The controller 8 supplies the threshold values thb1 and thb2 in performing the conversion.

The processing to be executed by the second edge preserver 61d is a processing of: stepwise compressing the original image I in such a manner that a low-frequency image is obtained as the processing proceeds to a lower stage, in other words, images with different resolutions are obtained, and decompressing the low-frequency image at each stage; and performing a synthesis in such a manner that an image of the edge portion in the low-frequency image at a certain stage is replaced by the low-frequency image at the stage higher than the certain stage, based on the edge information. In other words, the second edge preserver 61d repeatedly performs low-pass filter processing of performing a weighted averaging and downsampling to generate images with different resolutions, and performs upsampling while replacing an edge intensity. Hereinafter, this processing is sometimes called as "hierarchical low-pass filter processing" according to needs.

Similarly to the high contrast processor 60, the second edge preserver 61d in the high contrast processor 60a extracts an edge portion from a low-frequency image i.e. obtains composite coefficients "u" and "1-u" from the edge intensity, and performs a processing of using the high-frequency image as the edge portion and using the low-frequency image as a portion other than the edge portion. The first edge preserver 61c performs a similar processing as the second edge preserver 61d except that threshold values tha1 and tha2 are supplied to the MIX sections in the first edge preserver 61c. The threshold values tha1 and tha2 to be used in the first edge preserver 61c are different from the threshold values thb1 and thb2 to be used in the second edge preserver 61d. Since the edge preservation performance of the first edge preserver 61c is set higher than that of the second edge preserver 61d, the values of the threshold are tha1>thb1, and tha2<thb2. In the first embodiment, the threshold value E or the weight i.e. the standard deviation σg in the luminance direction of the edge preserving filter corresponds to the edge preservation performance. In the second embodiment, the threshold values tha1, tha2, and thb1, thb2 may correspond to the edge preservation performance. The same idea is applied to the third embodiment.

As described above, the first edge preserver 61c and the second edge preserver 61d in the high contrast processor 60a perform the high contrast processing, whereas the first edge preserver 61a and the second edge preserver 61b in the high contrast processor 60 perform the high contrast processing in the first embodiment. The arrangement in the second embodiment is advantageous in enhancing high-quality performance. Specifically, the second embodiment enables to perform dynamic range compression with high precision while preserving an edge and suppressing occurrence of a halo effect or the like, thereby enabling to obtain a high-quality image.

Figure 10:
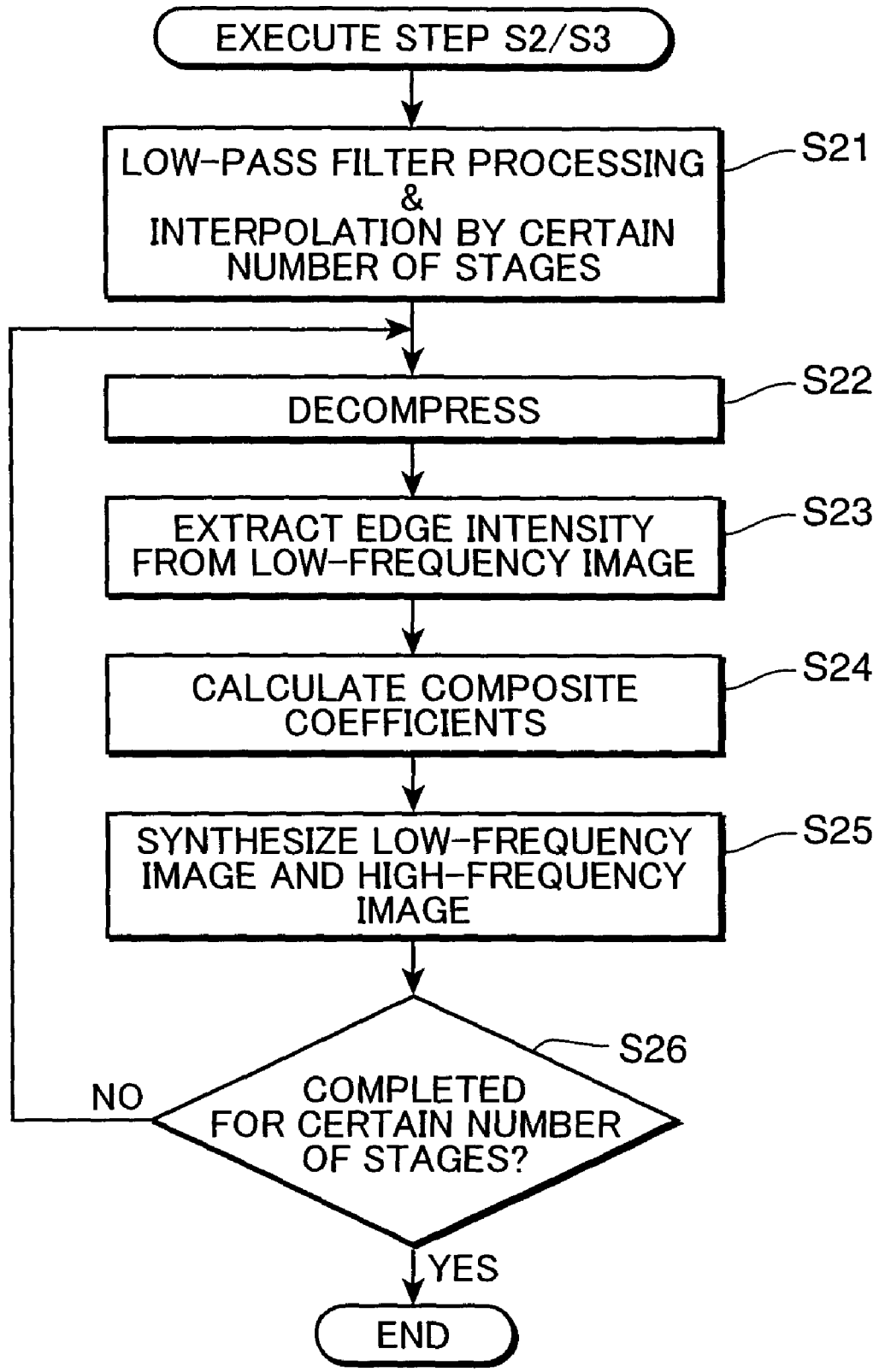
FIG. 10 is a flowchart showing an operation to be executed by the high contrast processor in the second embodiment.

FIG. 10 is a flowchart showing an operation of the high contrast processing in the second embodiment. In the second embodiment, the processing by the first edge preserver 61c and the second edge preserver 61d in the high contrast processor 60a is performed in place of the processing by the first edge preserver 61a and the second edge preserver 61b in the high contrast processor 60. Accordingly, the following description is made based on a premise that operations corresponding to the operations of Steps S2 and S3 in the flowchart (see FIG. 7) of the first embodiment are performed in the flowchart of FIG. 10. In this section, the operation of the second edge preserver 61d shown in FIG. 9, which corresponds to the operation of Step S3, is described. Since the operation of the first edge preserver 61c corresponding to the operation of Step S2 is the same as the operation of the second edge preserver 61d, description thereof is omitted herein.

In the second embodiment, referring to FIG. 9, in Step S3, in response to input of the input image I to the second edge preserver 61d, the compressors 510, 520; 530 sequentially: and hierarchically perform low-pass filter processing and interpolation to generate an image of a lower frequency (Step S21). Then, the US sections 507, 508, 509 perform image decompression with respect to the low-frequency images generated at the respective stages. Specifically, the US section 507 at the lowermost stage performs image decompression (Step S22). Then, a low-frequency image "Low" which has undergone the image decompression by the US section 507, and a low-frequency image outputted at the stage higher than the stage where the low-frequency image "Low" has undergone the decompression i.e. a high-frequency image "High" observed from the lower stage, are inputted to the MIX section 511, and the edge extractor 521 in the MIX section 511 extracts an edge intensity from the low-frequency image "Low" (Step S23). Then, the LUT section 522 in the MIX section 511 converts the extracted edge intensity into the weighting coefficient "u" based on the threshold values thb1 and thb2 in the lookup table, and calculates the composite coefficients "u" and "1-u" based on the weighting coefficient "u" (Step S24). Then, the first multiplier 523a, the second multiplier 523b, and the adder 524 are operative to synthesize the low-frequency image and the high-frequency image by inner product computation, using the composite coefficients, and output the computation result as a low-frequency image to be inputted to the succeeding upper stage (Step S25). The above processing is repeated from the lower stage to the upper stage. In other words, if the judgment result in Step S26 is negative, the routine returns to Step S22, and the loop from Step S22 to Step S25 is repeated until the judgment result in Step S26 is affirmative. After the processing is completed with respect to all the stages (YES in Step S26), the routine is ended, and the synthesis result is outputted as the illumination component L shown in FIG. 9, in other words, as the illumination component L2 in FIG. 8.

Third Embodiment

Figure 11:
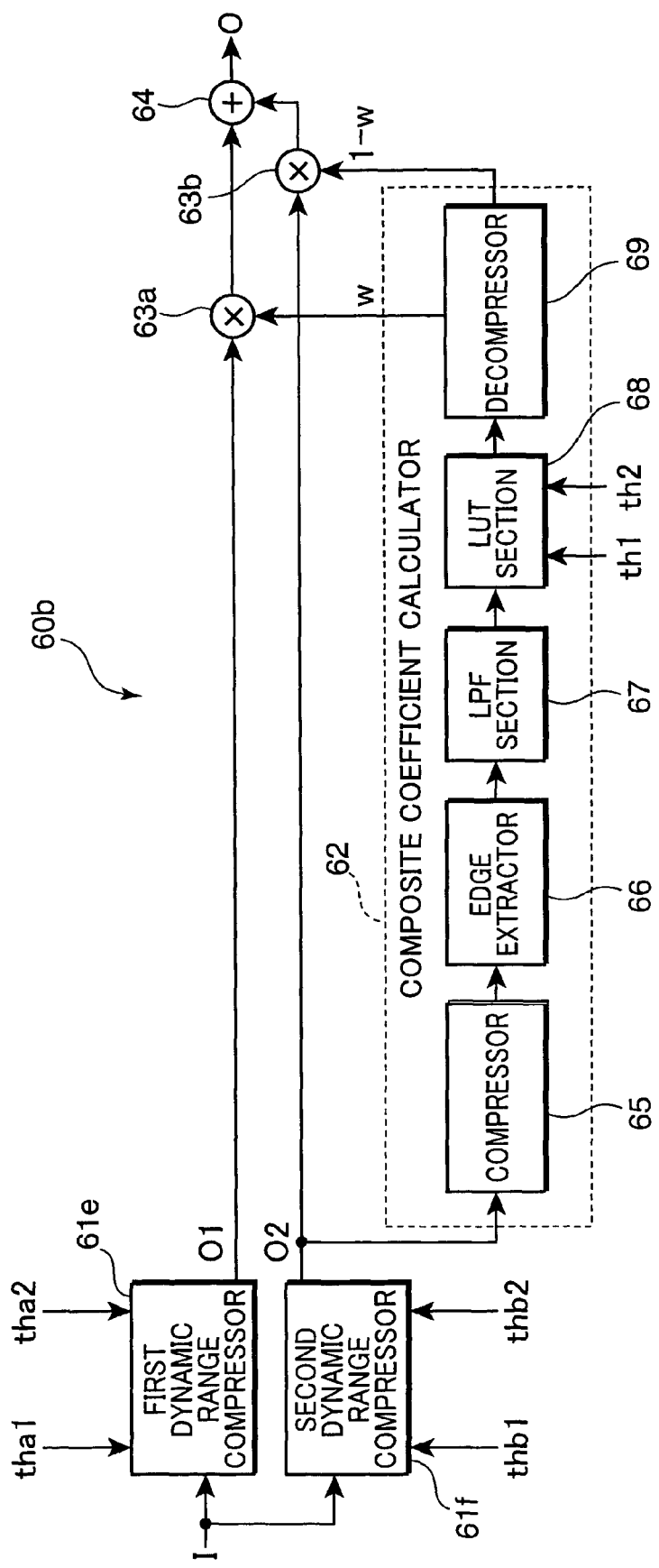
FIG. 11 is a block diagram showing a configuration of a high contrast processor in a third embodiment of the invention.
Figure 12:
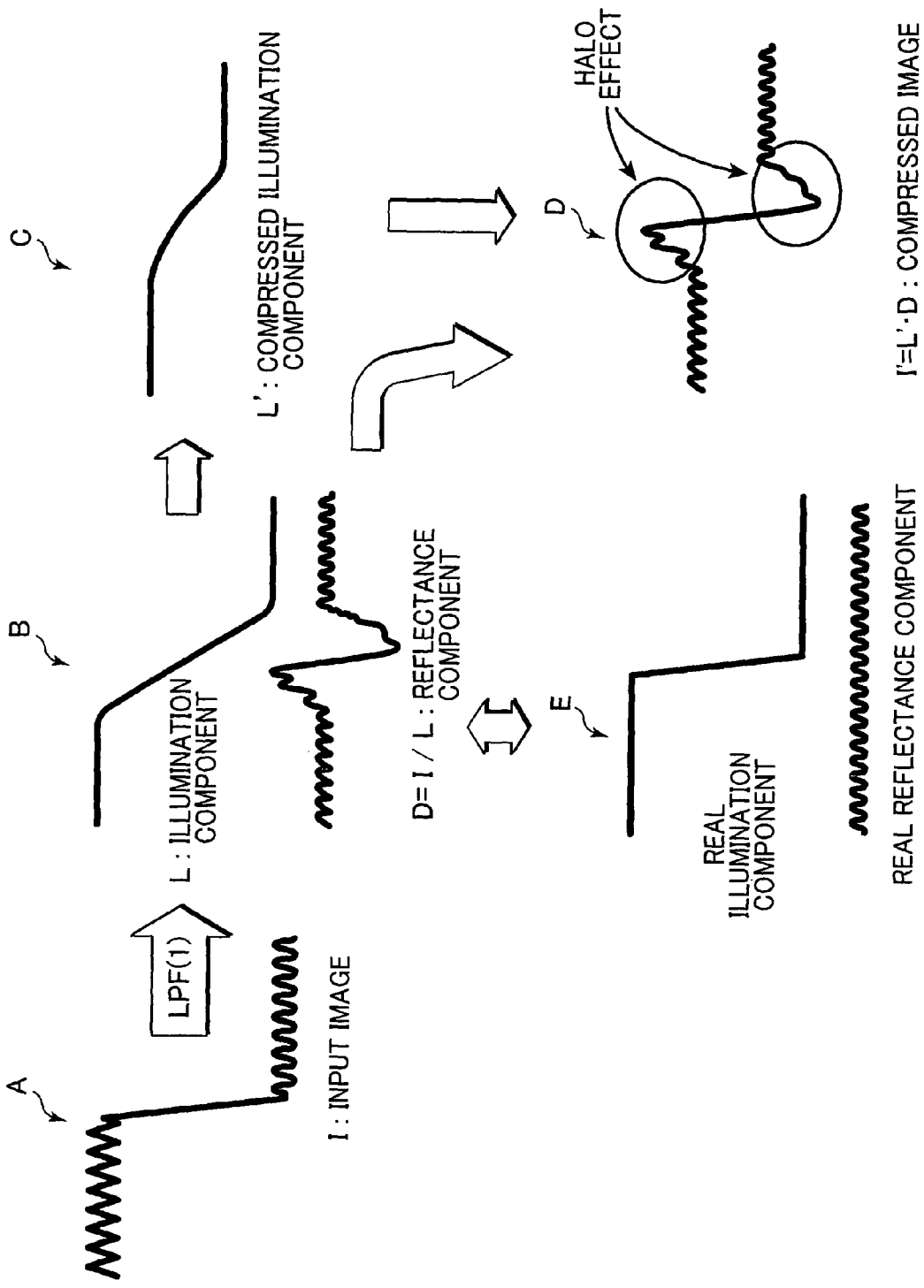
FIG. 12 is a schematic diagram for describing a dynamic range compression processing using a one-dimensional signal waveform.

FIG. 11 is a block diagram showing a configuration of a high contrast processor 60b in a third embodiment of the invention. Referring to FIG. 11, the high contrast processor 60b is primarily different from the high contrast processor 60 or 60a in that a first dynamic range compressor 61e and a second dynamic range compressor 61f are provided in place of the first edge preserver 61a and the second edge preserver 61b, or the first edge preserver 61c and the second edge preserver 61d. The first edge preserver 61a and the second edge preserver 61b (see FIG. 3), and the first edge preserver 61c and the second edge preserver 61d (see FIG. 8) process an image before dynamic range compression. In other words, in the first and the second embodiments, the illumination component L to be outputted from the adder 64 undergoes dynamic range compression by a dynamic range compressor provided after the high contrast processor 60 or 60a. In the third embodiment, an image which has undergone a dynamic range compression by the first dynamic range compressor 61e and the second dynamic range compressor 61f is processed. In this embodiment, the first dynamic range compressor 61e and the second dynamic range compressor 61f each are operative to calculate an illumination component L based on an input image I, perform dynamic range compression with respect to the illumination component L into an illumination component L', and generate output images O1 and O2, respectively, by performing the aforementioned computation: O=L/L'*I.

The edge preservation performance to be used in obtaining the illumination component L from the input image I is different between the first dynamic range compressor 61e and the second dynamic range compressor 61f. In this embodiment, the edge preservation performance of the first dynamic range compressor 61e for generating the output image O1 is set higher than that of the second dynamic range compressor 61f for generating the output image O2. A technique of obtaining the illumination components L that enables to differentiate the edge preservation performances one from the other may be the technique, as disclosed in the first embodiment, of using edge preserving filters e.g. the first edge preserver 61a and the second edge preserver 61b having different edge preservation performances e.g. an epsilon filter or a bilateral filter, or a technique, as disclosed in the second embodiment, of using the hierarchical low-pass filter processing (see FIG. 9) to be executed by the first edge preserver 61c and the second edge preserver 61d. The images with different edge preservation performances may be an intermediate image to be generated in the course of a series of processing, as disclosed in the first and the second embodiments, or a final image which has undergone the dynamic range compression, as disclosed in the third embodiment.

Similarly to the illumination components L1 and L2 in the first and the second embodiments, an edge intensity is extracted from the output image O2 having a low edge preservation performance to calculate the weighting coefficient "w", and consequently the composite coefficients "w" and "1-w". Then, a composite image O is outputted by synthesizing the output images O1 and O2, using the composite coefficients. In a flowchart (not shown) in the third embodiment, similar to the second embodiment, operations of the first dynamic range compressor 61e and the second dynamic range compressor 61f corresponding to the operations of Steps S2 and S3 in FIG. 7 are performed. In an operation in the third embodiment corresponding to the operation of Step S9, the composite image O is outputted by synthesizing the output images O1 and O2, using the composite coefficients.

As described above, in the image processing device of the embodiments i.e. in the image processor 6, a generator i.e. the first and the second edge preservers 61a and 61b, the first and the second edge preservers 61c and 61d, or the first and the second dynamic range compressors 61e and 61f generates multiple images having different edge preservation performances showing a degree of preserving an edge in the image e.g. the illumination components L1 and L2, or the output images O1 and O2, based on the original image. I. A detector i.e. the composite coefficient calculator 62 detects edge information e.g. an edge intensity from at least one of the original image I and the generated images. In the case where the edge information is detected from the original image I or the generated image having a high edge preservation performance, the operation described in the following modifications is performed. The same idea is also applied to the below mentioned description. A synthesizer i.e. the first multiplier 63a, the second multiplier 63b, and the adder 64 synthesizes the generated images having the different edge preservation performances e.g. the illumination components L1 and L2, or the output images O1 and O2, based on the edge information e.g. by using the composite coefficients "w" and the "1-w" derived from the edge intensity.

According to the image processing method of the embodiments, in the generating step, multiple images having different edge preservation performances e.g. the illumination components L1 and L2, or the output images O1 and O2 are generated based on the original image I. In the detecting step, edge information e.g. an edge intensity is detected from at least one of the original image I and the generated images. In the synthesizing step, the generated images having the different edge preservation performances are synthesized based on the edge information e.g. the composite coefficients "w" and "1-w" derived from the edge intensity.

According to the image processing device and the image processing method, the images having the different edge preservation performances i.e. the images having the low edge preservation performance and the high edge preservation performance are generated. The images having the low edge preservation performance and the high edge preservation performance are synthesized, based on the edge information e.g. by using the information on the composite coefficients derived from the edge intensity in such a manner that the image of the edge portion in the image having the low edge preservation performance is replaced by the image having the high edge preservation performance. In this arrangement, in the case where the image obtained by the synthesis undergoes a dynamic range compression, a resultant image has a high contrast both in the low luminance region and the high luminance region by the dynamic range compression. This enables to obtain a high-quality image with the edge portion being properly preserved with no or less halo effect or the like in the edge portion.

The synthesizer synthesizes the generated images having the different edge preservation performances in such a manner that the image of the edge portion in the generated image having the low edge preservation performance e.g. the illumination component L2 or the output image O2 is replaced by the generated image having the high edge preservation performance e.g. the illumination component L1 or the output image O1. This enables to properly preserve the edge portion with no or less halo effect or the like in the edge portion in performing the dynamic range compression.

The detector includes: a compressor i.e. the compressor 65 for compressing at least one of the original image I and the generated images e.g. the illumination component L2 or the output image O2 into a compressed image; an extractor i.e. the edge extractor 66 for extracting an edge intensity as the edge information from the compressed image; and a coefficient calculator i.e. the LUT section 68 for calculating the composite coefficients "w" and "1-w" to be used in synthesizing the generated images based on the edge intensity. The synthesizer synthesizes the generated images having the different edge preservation performances using the composite coefficients. This enables to easily realize an arrangement of detecting the edge information from the one image, and synthesizing the generated images based on the edge information. Also, obtaining the compressed image is advantageous in removing a high-frequency component from an image i.e. obtaining an image with a lower frequency, and in reducing the processing load to thereby increase the processing rate.

The coefficient calculator calculates the composite coefficient or the weighting coefficient "w" from the edge intensity, based on a conversion characteristic defined by a predetermined threshold value relating to the synthesis e.g. the threshold values th1 and th2, in other words, a conversion table as a lookup table e.g. the conversion characteristic 221, or by using a predetermined conversion formula. This enables to easily calculate the composite coefficient from the edge intensity.

The generator generates multiple illumination component images having the different edge preservation performances i.e. the illumination components L1 and L2 by performing edge preservation filter processing with respect to the original image I using a predetermined edge preserving filter. This enables to easily generate the illumination component images having the different edge preservation performances based on the original image I.

The generator generates multiple illumination components having the different edge preservation performances i.e. the illumination components L1 and L2 or the illumination component L in FIG. 9 by performing a hierarchical processing i.e. the hierarchical low-pass filter processing including: a process of stepwise compressing the original image I in such a manner that an image of a lower frequency is generated as the processing proceeds to a lower stage, which is executed by the compressors 510, 520, 530, and decompressing the low-frequency image at each stage, which is executed by the US sections 507, 508, 509; and a process of performing a synthesis, which is executed by the MIX sections 511, 512, 513, in such a manner that an image of an edge portion in the low-frequency image at a certain stage is replaced by a low-frequency image at the stage higher than the certain stage i.e. a high-frequency image, based on the edge information derived from the low-frequency image i.e. the edge intensity extracted by the edge extractor 521. T his enables to easily generate the illumination component images having the different edge preservation performances i.e. the illumination components L1 and L2 by the hierarchical processing. Also, since the generator performs the hierarchical processing, a high-quality image with the edge portion being properly preserved can be obtained with no or less halo effect or the like in the edge portion.

The image processing device further includes a dynamic range compressor to be provided after the high contrast processor 60 or 60a in the image processor 6. The dynamic range compressor performs a dynamic range compression with respect to a composite illumination component image obtained by synthesizing the illumination component images by the synthesizer e.g. the illumination component L to be outputted from the adder 64 shown in FIG. 3 or 8. This enables to obtain an image having a high contrast both in the low luminance region and the high luminance region. The high contrast processing is advantageous in properly preserving the edge portion with no or less halo effect or the like in the edge portion.

The generator i.e. the first and the second dynamic range compressors 61e and 61f includes a function of performing a dynamic range compression. The generator is operative to perform the dynamic range compression with respect to the illumination component image obtained by at least one of the edge preservation filter processing and a hierarchical processing to generate output images O1 and O2 having the different edge preservation performances using the illumination component image which has undergone the dynamic range compression. This enables to realize an arrangement of performing the dynamic range compression in generating the images having the different edge preservation performances, unlike an arrangement of obtaining the composite illumination component i.e. the illumination component L obtained by synthesizing the illumination component images i.e. the illumination components L1 and L2, followed by dynamic range compression. Thus, the arrangement is advantageous in flexibly obtaining a high-quality image having a high contrast both in the low luminance region and the high luminance region, while properly preserving the edge portion.

The edge preserving filter is an epsilon filter or a bilateral filter. This enables to control the edge preservation performance based on a threshold value difference in the luminance direction of the epsilon filter, or a weight difference in the luminance direction of the bilateral filter. Thus, the arrangement is advantageous in easily generating the images having the different edge preservation performances.

In the image processing method, the generating step is a step of generating two images having the different edge preservation performances i.e. the illumination components L1 and L2, or the output images O1 and O2, wherein one of the images has a first edge preservation performance, and the other of the images has a second edge preservation performance lower than the first edge preservation performance. The detecting step is a step of compressing the generated image having the second edge preservation performance i.e. the illumination component L2 or the output image O2 into a compressed image, extracting an edge intensity as the edge information from the compressed image, and calculating composite coefficient "w" and "1-w" to be used in synthesizing the two generated images based on the edge intensity. In the synthesizing step, the two generated images having the different edge preservation performances are synthesized by using the composite coefficients. This enables to realize an arrangement of detecting the edge information from the generated image having the second edge preservation performance, and synthesizing the generated images having the first and the second edge preservation performances based on the edge information. Also, generating the compressed image is advantageous in removing a high-frequency component from an image i.e. obtaining an image with a lower frequency, and in reducing the processing load to thereby increase the processing rate.

The following modifications may be applied to the invention.

(A) In the embodiments, the image sensor 3 capable of performing a wide dynamic range image shooting and having different photoelectric conversion characteristics is a linear-logarithmic sensor having linear/logarithmic characteristics i.e. a linear characteristic in the low luminance region and a logarithmic characteristic in the high luminance region. Alternatively, the image sensor may be a sensor having a first linear characteristic in the low luminance region and a second linear characteristic in the high luminance region, and a feature that the gradients of the linear characteristic curves in the linear characteristics are changed depending on the luminance level. Further alternatively, the image sensor may be an image sensor having three or more different photoelectric conversion characteristics, in place of the image sensor having the two different photoelectric conversion characteristics i.e. the linear/logarithmic characteristics, or the first and the second linear characteristics. Further alternatively, the image sensor may be an image sensor capable of capturing an image in the high luminance region and an image in the low luminance region by one-time shooting i.e. one-time exposure, and acquiring a wide dynamic range image by synthesizing the two images. As far as an image sensor is capable of acquiring a wide dynamic range image, any image sensor may be used.

(B) The first through the third embodiments disclose an arrangement of obtaining an edge intensity i.e. a composite coefficient from an image having a low edge preservation performance. Alternatively, a composite coefficient may be obtained from an image having a high edge preservation performance. In the modification, similarly to the first embodiment, the first edge preserver 61a may have a high edge preservation performance, and an input line 621 of the composite coefficient calculator 62 may be connected to an output line of the first edge preserver 61a e.g. at a site indicated by the reference numeral 622 in FIG. 3. In the modification, the compressor 65 compresses the illumination component L2 with a larger compression performance until the edge preservation performance difference between the illumination components L1 and L2 is eliminated, or until the edge preservation performance of the illumination component L2 is smaller than that of the illumination component L1. In the modification, the weights to be applied to the illumination components L1 and L2 in synthesizing the illumination components L1 and L2 are opposite to those to be applied in the embodiments. Specifically, the composite coefficient "1-w" is applied to the illumination component L1, and the composite coefficient "w" is applied to the illumination component L2. This idea is also applied to the arrangements shown in FIGS. 8 and 11.

(C) In the modification (B), as far as an edge intensity is extractable from an image, and a composite coefficient to be used in synthesizing images having different edge preservation performances is obtainable, the composite coefficient may be derived from the input image I. Specifically, as shown in FIG. 3, the input line 621 of the composite coefficient calculator 62 may be connected to the site indicated by the reference numeral 623 i.e. a position on the line before the input image I is inputted to the first edge preserver 61a and the second edge preserver 61b. This idea is also applied to the arrangements shown in FIGS. 8 and 11.

(D) The embodiments disclose an arrangement of generating two images having different edge preservation performances i.e. the illumination components L1 and L2, or the output images O1 and O2. Alternatively, three or more images having different edge preservation performances e.g. two images having a high edge preservation performance and two images having a low edge preservation performance i.e. four images in total may be generated. In the modification, at least one or more of the four images may be compressed, an edge intensity may be extracted from the compressed image(s) to calculate a composite coefficient, and the images having the different edge preservation performances may be synthesized by using the composite coefficient in the similar manner as mentioned above.

(E) The embodiments disclose an arrangement of executing various processing relating to noise reduction with respect to a captured image such as frequency separation, synthesis, coring, or edge preservation, by the image processor 6 in the digital camera 1. Alternatively, these processing may be performed by a predetermined processor outside the digital camera 1. Specifically, these processing may be executed by a predetermined host processor with a user interface e.g. a PC (personal computer) or a PDA (personal digital assistant), which is directly i.e. wiredly connected to the digital camera 1 by e.g. a USB, wirelessly connected to a network by e.g. a wireless LAN, or communicatively connected with use of a storage medium such a memory card.

The specification discloses the aforementioned arrangements. The following is a summary of the primary arrangements of the embodiments.

An image processing device according to an aspect of the invention comprises: a generator for generating multiple images having different edge preservation performances showing a degree of preserving an edge in the image, based on an original image; a detector for detecting edge information from at least one of the original image and the generated images; and a synthesizer for synthesizing the generated images having the different edge preservation performances based on the edge information in such a manner that an image of an edge portion in the generated image having a low edge preservation performance is replaced by the generated image having a high edge preservation performance.

In the above arrangement, the generator generates the multiple images having the different edge preservation performances showing a degree of preserving an edge in the image based on the original image. The detector detects the edge information from at least the one of the original image and the generated images. The synthesizer synthesizes the generated images having the different edge preservation performances based on the edge information in such a manner that the image of the edge portion in the generated image having the low edge preservation performance is replaced by the generated image having the high edge preservation performance.

In the above arrangement, the images with the different edge preservation performances i.e. the images with the low edge preservation performance and the high edge preservation performance are generated. The images with the low edge preservation performance and the high edge preservation performance are synthesized, based on the edge information i.e. by using the information on the composite coefficient derived from the edge intensity in such a manner that the image of the edge portion in the image with the low edge preservation performance is replaced by the image with the high edge preservation performance. In this arrangement, in the case where the image obtained by the synthesis undergoes e.g. dynamic range compression, a resultant image has a high contrast both in the low luminance region and the high luminance region by the dynamic range compression. This enables to obtain a high-quality image with the edge portion being properly preserved while suppressing occurrence of a halo effect or the like in the edge portion.

Preferably, the detector includes: a compressor for compressing the one generated image into a compressed image, an extractor for extracting an edge intensity as the edge information from the compressed image; and a coefficient calculator for calculating a composite coefficient to be used in synthesizing the generated images based on the edge intensity, wherein the synthesizer synthesizes the generated images by using the composite coefficient.

In the above arrangement, the compressor compresses at least the one of the original image and the generated images into the compressed image. The extractor extracts the edge intensity as the edge information from the compressed image. The coefficient calculator calculates the composite coefficient to be used in synthesizing the generated images based on the edge intensity. The synthesizer synthesizes the generated images by using the composite coefficient. This enables to easily realize an arrangement of detecting the edge information from the one image, and synthesizing the generated images based on the edge information. Also, obtaining the compressed image is advantageous in removing a high-frequency component from an image i.e. obtaining an image with a lower frequency, and in reducing the processing load to thereby increase the processing rate.

Preferably, the coefficient calculator calculates the composite coefficient from the edge intensity, based on a conversion characteristic defined by a predetermined threshold value relating to the synthesis.

In the above arrangement, the coefficient calculator calculates the composite coefficient from the edge intensity, based on the conversion characteristic defined by the predetermined threshold value relating to the synthesis. This enables to easily calculate the composite coefficient from the edge intensity.

Preferably, the generator generates multiple illumination component images having the different edge preservation performances by performing a filter processing with respect to the original image using a predetermined edge preserving filter.

In the above arrangement, the generator generates the multiple illumination component images having the different edge preservation performances by performing the filter processing with respect to the original image, using the predetermined edge preserving filter. This enables to easily generate the illumination component images having the different edge preservation performances, based on the original image.

Preferably, the generator generates multiple illumination component images having the different edge preservation performances by performing a hierarchical processing, the hierarchical processing including: a process of stepwise compressing the original image in such a manner that an image of a lower frequency is generated as the processing proceeds to a lower stage, and decompressing the low-frequency image at each stage; and a process of performing a synthesis in such a manner that an image of an edge portion in the low-frequency image at a certain stage is replaced by the low-frequency image at the stage higher than the certain stage based on the edge information derived from the low-frequency image.

In the above arrangement, the generator generates the multiple illumination component images having the different edge preservation performances by performing the hierarchical processing. The hierarchical processing includes: the process of stepwise compressing the original image in such a manner that the image of the lower frequency is generated as the processing proceeds to the lower stage, and decompressing the low-frequency image at each stage; and the process of performing the synthesis in such a manner that the image of the edge portion in the low-frequency image at the certain stage is replaced by the low-frequency image at the stage higher than the certain stage based on the edge information derived from the low-frequency image. The hierarchical processing is advantageous in easily generating the illumination component images having the different edge preservation performances. Also, since the generator performs the hierarchical processing, a high-quality image with the edge portion being properly preserved can be obtained while suppressing occurrence of a halo effect or the like in the edge portion.

Preferably, the image processing device further comprises: a dynamic range compressor for performing a dynamic range compression with respect to a composite illumination component image obtained by synthesizing the illumination component images by the synthesizer.

In the above arrangement, the dynamic range compressor performs the dynamic range compression with respect to the composite illumination component image obtained by synthesizing the illumination component images by the synthesizer. This enables to obtain an image with a high contrast both in the low luminance region and the high luminance region. This is advantageous in properly preserving the edge portion while suppressing occurrence of a halo effect or the like in the edge portion in performing the high contrast processing.

Preferably, the generator includes a function of performing a dynamic range compression, and the generator is operative to perform the dynamic range compression with respect to the illumination component image obtained by at least one of: the filter processing and a hierarchical processing to generate multiple output images having the different edge preservation performances by using the illumination component image which has undergone the dynamic range compression.

In the above arrangement, the generator includes the function of performing the dynamic range compression. The generator is operative to perform the dynamic range compression with respect to the illumination component image obtained by at least one of the filter processing and the hierarchical processing to generate the multiple output images having the different edge preservation performances by using the illumination component image which has undergone the dynamic range compression. This enables to realize an arrangement of performing the dynamic range compression in generating the images having the different edge preservation performances, unlike an arrangement of obtaining a composite illumination component obtained by synthesizing the illumination component images, followed by dynamic range compression. Thus, the arrangement is advantageous in flexibly obtaining a high-quality image having a high contrast both in the low luminance region and the high luminance region, while properly preserving the edge portion.

Preferably, the edge preserving filter is an epsilon filter or a bilateral filter.

In the above arrangement, the edge preserving filter is an epsilon filter or a bilateral filter. This enables to control the edge preservation performance based on a threshold value difference in the luminance direction of the epsilon filter, or a weight difference in the luminance direction of the bilateral filter. Thus, the arrangement is advantageous in easily generating the images having the different edge preservation performances.

An image processing method according to another aspect of the invention comprises: a generating step of generating multiple images having different edge preservation performances showing a degree of preserving an edge in the image, based on an original image; a detecting step of detecting edge information from at least one of the original image and the generated images; and a synthesizing step of synthesizing the generated images having the different edge preservation performances based on the edge information in such a manner that an image of an edge portion in the generated image having a low edge preservation performance is replaced by the generated image having a high edge preservation performance.

In the above arrangement, in the generating step, the multiple images having the different edge preservation performances showing the degree of preserving the edge in the image are generated based on the original image. In the detecting step, the edge information is detected from at least the one of the original image and the generated images. In the synthesizing step, the generated images having the different edge preservation performances are synthesized based on the edge information in such a manner that the image of the edge portion in the generated image having the low edge preservation performance is replaced by the generated image having the high edge preservation performance. According to the arrangement, the images with the different edge preservation performances i.e. the images with the low edge preservation performance and the high edge preservation performance are generated. The images with the low edge preservation performance and the high edge preservation performance are synthesized, based on the edge information i.e. by using the information on the composite coefficient derived from the edge intensity in such a manner that the image of the edge portion in the image with the low edge preservation performance is replaced by the image with the high edge preservation performance. In this arrangement, in the case where the image obtained by the synthesis undergoes e.g. dynamic range compression, a resultant image has a high contrast both in the low luminance region and the high luminance region by the dynamic range compression, and a high-quality image with the edge portion being properly preserved can be obtained with no or less halo effect or the like in the edge portion.

Preferably, in the image processing method, the generating step is a step of generating two images having the different edge preservation performances, the one of the images having a first edge preservation performance, and the other of the images having a second edge preservation performance lower than the first edge preservation performance, the detecting step is a step of compressing the generated image having the second edge preservation performance into a compressed image, extracting an edge intensity as the edge information from the compressed image, and calculating a composite coefficient to be used in synthesizing the two generated images based on the edge intensity, and the synthesizing step is a step of synthesizing the two generated images by using the composite coefficient.

In the above arrangement, in the generating step, the two images having the different edge preservation performances are generated, wherein the one of the images has the first edge preservation performance, and the other of the images has the second edge preservation performance lower than the first edge preservation performance. In the detecting step, the generated image having the second edge preservation performance is compressed into the compressed image, the edge intensity as the edge information is extracted from the compressed image, and the composite coefficient to be used in synthesizing the two generated images is calculated based on the edge intensity. In the synthesizing step, the two generated images are synthesized by using the composite coefficient. This arrangement enables to easily realize an arrangement of detecting the edge information from the generated image having the second edge preservation performance, and synthesizing the generated images having the first edge preservation performance and the second edge preservation performance, based on the edge information. Also, generating the compressed image is advantageous in removing a high-frequency component from an image i.e. obtaining an image with a lower frequency, and in reducing the processing load to thereby increase the processing rate.

Although the invention has been appropriately and fully described by way of examples with reference to the accompanying drawings, it is to be understood that various changes and/or modifications will be apparent to those skilled in the art. Therefore, unless otherwise such changes and/or modifications depart from the scope of the present invention hereinafter defined, they should be construed as being included, therein.

What is claimed is:

1. An image processing device, comprising:
    a memory; and
    a processor operatively connected to said memory, said processor being programmed to perform image processing by performing steps comprising:
    generating multiple images having different edge preservation performances showing a hierarchical degree of preserving an edge in the image, based on a single original image, said step including generating multiple illumination component images having the different edge preservation performances by performing a filter processing with respect to the original image using a predetermined edge preserving filter;
    detecting edge information from at least one of the original image and the generated images;
    synthesizing the generated images having the different edge preservation performances based on the edge information in such a manner that an image of an edge portion in the generated image having a low edge preservation performance is replaced by the generated image having a high edge preservation performance; and
    performing a dynamic range compression with respect to a composite illumination component image obtained by synthesizing the illumination component images by the synthesizer.

2. The image processing device according to claim 1, wherein the edge preserving filter is an epsilon filter or a bilateral filter.

3. An image processing device, comprising:
    a memory; and
    a processor operatively connected to said memory, said processor being configured to perform image processing by performing the steps comprising:
    generating multiple images having different edge preservation performances showing a degree of preserving an edge in the image, based on an original image;
    detecting edge information from at least one of the original image and the generated images; and
    synthesizing the generated images having the different edge preservation performances based on the edge information in such a manner that an image of an edge portion in the generated image having a low edge preservation performance is replaced by the generated image having a high edge preservation performance;
    wherein the step of detecting includes:
    compressing the one generated image into a compressed image,
    extracting an edge intensity as the edge information from the compressed image; and
    calculating a composite coefficient to be used in synthesizing the generated images based on the edge intensity, wherein
    the step of synthesizing synthesizes the generated images by using the composite coefficient.

4. The image processing device according to claim 3, wherein
    the processor is programmed so that the step of calculating a composite coefficient calculates the composite coefficient from the edge intensity, based on a conversion characteristic defined by a predetermined threshold value relating to the synthesis.

5. An image processing device, comprising:

a memory; and a processor operatively connected to said memory, said processor being programmed to perform image processing by performing steps comprising:

generating multiple images having different edge preservation performances showing a degree of preserving an edge in the image, based on an original image;

detecting edge information from at least one of the original image and the generated images; and synthesizing the generated images having the different edge preservation performances based on the edge information in such a manner that an image of an edge portion in the generated image having a low edge preservation performance is replaced by the generated image having a high edge preservation performance;

wherein the step of generating generates multiple illumination component images having the different edge preservation performances by performing a hierarchical processing, the hierarchical processing including:

a process of stepwise compressing the original image in such a manner that an image of a lower frequency is generated as the processing proceeds to a lower stage, and decompressing the low-frequency image at each stage; and a process of performing a synthesis in such a manner that an image of an edge portion in the low-frequency image at a certain stage is replaced by the low-frequency image at the stage higher than the certain stage based on the edge information derived from the low-frequency image.

6. An image processing device, comprising:

a memory; and a processor operatively connected to said memory, said processor being programmed to perform image processing by performing steps comprising:

generating multiple images having different edge preservation performances showing a hierarchical degree of preserving an edge in the image, based on a single original image, said step including generating multiple illumination component images having the different edge preservation performances by performing a filter processing with respect to the original image using a predetermined edge preserving filter;

detecting edge information from at least one of the original image and the generated images; and synthesizing the generated images having the different edge preservation performances based on the edge information in such a manner that an image of an edge portion in the generated image having a low edge preservation performance is replaced by the generated image having a high edge preservation performance;

wherein the step of generating includes a function of performing a dynamic range compression, and the step of generating is operative to perform the dynamic range compression with respect to the illumination component image obtained by at least one of the filter processing and a hierarchical processing to generate multiple output images having the different edge preservation performances by using the illumination component image which has undergone the dynamic range compression.

7. The image processing device according to claim 6, wherein the edge preserving filter is an epsilon filter or a bilateral filter.

8. An image processing method, comprising:

a generating step of generating multiple images having different edge preservation performances showing a hierarchical degree of preserving an edge in the image, based on a single original image;

a detecting step of detecting edge information from at least one of the original image and the generated images; and a synthesizing step of synthesizing the generated images having the different edge preservation performances based on the edge information in such a manner that an image of an edge portion in the generated image having a low edge preservation performance is replaced by the generated image having a high edge preservation performance;

a dynamic range compressing step for performing a dynamic range compression with respect to a composite illumination component image obtained by synthesizing the illumination component images by the synthesizing step;

wherein the generating step generates multiple illumination component images having the different edge preservation performances by performing a filter processing with respect to the original image using a predetermined edge preserving filter.

9. An image processing method, comprising:

a generating step of generating multiple images having different edge preservation performances showing a degree of preserving an edge in the image, based on an original image;

a detecting step of detecting edge information from at least one of the original image and the generated images; and a synthesizing step of synthesizing the generated images having the different edge preservation performances based on the edge information in such a manner that an image of an edge portion in the generated image having a low edge preservation performance is replaced by the generated image having a high edge preservation performance;

wherein the generating step is a step of generating two images having the different edge preservation performances, the one of the images having a first edge preservation performance, and the other of the images having a second edge preservation performance lower than the first edge preservation performance, the detecting step is a step of compressing the generated image having the second edge preservation performance into a compressed image, extracting an edge intensity as the edge information from the compressed image, and calculating a composite coefficient to be used in synthesizing the two generated images based on the edge intensity, and the synthesizing step is a step of synthesizing the two generated images by using the composite coefficient.

* * * * *